United States Patent
Michie, Jr. et al.

(10) Patent No.: US 10,844,202 B2
(45) Date of Patent: Nov. 24, 2020

(54) HIGH-DENSITY POLYETHYLENE COMPOSITIONS, METHOD OF MAKING THE SAME, INJECTION MOLDED ARTICLES MADE THEREFROM, AND METHOD OF MAKING SUCH ARTICLES

(71) Applicant: Dow Global Technologies LLC, Midland, MI (US)

(72) Inventors: William J. Michie, Jr., Missouri City, TX (US); Stephanie M. Whited, Charleston, WV (US); Nathan J. Wiker, Midland, MI (US); Dale M. Elley-Bristow, Callingwood (CA)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 15/135,044

(22) Filed: Apr. 21, 2016

(65) Prior Publication Data
US 2016/0237266 A1   Aug. 18, 2016

Related U.S. Application Data

(63) Continuation of application No. 12/377,334, filed as application No. PCT/US2007/082502 on Oct. 25, 2007, now abandoned.
(Continued)

(51) Int. Cl.
*C08L 23/08* (2006.01)
*B29C 43/02* (2006.01)
(Continued)

(52) U.S. Cl.
CPC ............ *C08L 23/08* (2013.01); *B29C 43/003* (2013.01); *B29C 43/02* (2013.01);
(Continued)

(58) Field of Classification Search
None
See application file for complete search history.

(56) References Cited

U.S. PATENT DOCUMENTS 4,587,227 A † 5/1986 Smith
6,599,971 B2 † 7/2003 Dotson
(Continued)

FOREIGN PATENT DOCUMENTS

GB    2440525    * 2/2008
WO    01/05852   † 1/2001
(Continued)

OTHER PUBLICATIONS

English Abstract of Dong CN 2379425, May 2000 (Year: 2000).*
(Continued)

*Primary Examiner* — Ronak C Patel

(57) ABSTRACT

The instant invention is a high-density polyethylene composition, method of producing the same, injection molded articles made therefrom, and method of making such articles. The high-density polyethylene composition of the instant invention includes a first component, and a second component. The first component is a high molecular weight ethylene alpha-olefin copolymer having a density in the range of 0.920 to 0.946 g/cm$^3$, and a melt index ($I_{21.6}$) in the range of 1 to 15 g/10 minutes. The second component is a low molecular weight ethylene polymer having a density in the range of 0.965 to 0.980 g/cm$^3$, and a melt index ($I_2$) in the range of 30 to 1500 g/10 minutes. The high-density polyethylene composition has a melt index ($I_2$) of at least 1, a density in the range of 0.950 to 0.960 g/cm$^3$.

2 Claims, 7 Drawing Sheets

Related U.S. Application Data

(60) Provisional application No. 60/927,176, filed on May 2, 2007.

(51) Int. Cl.

| | | |
|---|---|---|
| *B65D 41/24* | (2006.01) | |
| *B29C 49/00* | (2006.01) | |
| *B29C 45/00* | (2006.01) | |
| *C08L 23/06* | (2006.01) | |
| *B29C 43/00* | (2006.01) | |
| *C08F 210/16* | (2006.01) | |
| *H01B 3/44* | (2006.01) | |
| *B29C 43/52* | (2006.01) | |
| *B29K 23/00* | (2006.01) | |
| *B29K 105/00* | (2006.01) | |
| *B29L 31/56* | (2006.01) | |

(52) U.S. Cl.
CPC ...... *B29C 45/0001* (2013.01); *B29C 49/0005* (2013.01); *B65D 41/24* (2013.01); *C08F 210/16* (2013.01); *C08L 23/06* (2013.01); *H01B 3/441* (2013.01); *B29C 43/52* (2013.01); *B29K 2023/065* (2013.01); *B29K 2105/0094* (2013.01); *B29K 2995/0063* (2013.01); *B29L 2031/565* (2013.01); *C08L 2205/02* (2013.01); *C08L 2207/062* (2013.01)

(56) References Cited

U.S. PATENT DOCUMENTS

| | | | |
|---|---|---|---|
| 7,491,762 B2 † | 2/2009 | Wolters | |
| 2004/0266966 A1 * | 12/2004 | Schramm | ............... C08L 23/12 526/352 |
| 2006/0138138 A1 † | 6/2006 | Mishra | |
| 2007/0007680 A1 * | 1/2007 | Henri Barre | ........ B29C 47/0026 264/40.1 |
| 2008/0033111 A1 * | 2/2008 | Polosa | ................... B65D 41/00 525/240 |
| 2010/0105839 A1 * | 4/2010 | Mehta | .................... C08L 23/06 525/195 |

FOREIGN PATENT DOCUMENTS

| | | | | |
|---|---|---|---|---|
| WO | WO-03016396 A1 * | 2/2003 | .......... C08L 23/0815 |
| WO | WO 2004/101674 | * | 11/2004 | |

OTHER PUBLICATIONS

Chinese Divisional 4th Office Action dated Dec. 20, 2016; from counterpart Chinese Divisional Application No. 2013102383282.

Chinese Divisional Office Action dated Jun. 1, 2016; from Chinese Divisional counterpart Application No. 2013402383282.

Lee, "Method for Controlling Polymer Shrinkage", United States Statutory Invention Registration No. H1301, published Apr. 5, 1994.†

\* cited by examiner
† cited by third party

HIGH-DENSITY POLYETHYLENE COMPOSITIONS, METHOD OF MAKING THE SAME, INJECTION MOLDED ARTICLES MADE THEREFROM, AND METHOD OF MAKING SUCH ARTICLES

CROSS-REFERENCE TO RELATED APPLICATIONS

This application is a Continuation of U.S. patent application Ser. No. 12/377,334, filed Feb. 12, 2009; which claims priority to PCT/US2007/082502, filed Oct. 25, 2007; which claims priority to U.S. Provisional Application No. 60/927,176, filed May 2, 2007, the disclosures of which are incorporated herein by reference.

FIELD OF INVENTION

The instant invention relates to high-density polyethylene compositions, method of producing the same, and injection molded articles made therefrom, and method of making such articles.

BACKGROUND OF THE INVENTION

The use of polymeric materials to manufacture molded articles, such as closure devices, is generally known. Different methods may be employed to manufacture closure devices, e.g. bottle caps. For example, such closure devices may be manufactured via compression molding or injection molding processes.

In compression molding process, a two-piece mold provides a cavity having the shape of a desired molded article. The mold is heated. An appropriate amount of molten molding compound from an extruder is loaded into the lower half of the mold. The two parts of the mold are brought together under pressure. The molding compound, softened by heat, is thereby welded into a continuous mass having the shape of the cavity. If the molding compound is a thermosetting material, the continuous mass may be hardened via further heating, under pressure, in the mold. If the molding compound is a thermoplastic material, the continuous mass may be hardened via chilling, under pressure, in the mold.

In injection molding process, molding compound is fed into an extruder via a hopper. The extruder conveys, heats, melts, and pressurizes the molding compound to a form a molten stream. The molten stream is forced out of the extruder through a nozzle into a relatively cool mold held closed under pressure thereby filing the mold. The melt cools and hardens until fully set-up. The mold then opens and the molded part is removed.

In general, a closure device, e.g. a soda bottle cap, should be strong enough to withstand the pressure of a carbonated drink, and yet soft enough to provide an excellent seal on the bottle without the need for an inner liner. Additionally, a closure device, e.g. a soda bottle cap, should generally possess good environmental stress crack resistance, good impact strength, good removal torque, and good strip torque. Different techniques have been employed to provide for such closure devices having acceptable properties.

For example, the use of a polypropylene polymer as a bottle cap closure for the needed strength with an inner liner, which may be comprised of soft ethylene/vinyl acetate (EVA), polyvinyl chloride (PVC), butyl rubber, etc., is also generally well known. However, this two-part construction is costly because of the need for an inner liner. Furthermore, it would be easier and more convenient to use a one-piece closure, without a liner. Additionally, customers are always looking for improved shrinkage behavior. All polymers undergo shrinkage from the melt to the solid. Improved shrinkage is defined as consistently the same and having a tight tolerance, especially when various colors are used. In the instant invention, the polymer composition in either natural or colored form provides improved consistency as defined as a lower standard deviation of flow direction shrinkage as a percentage of the mean shrinkage across multiple colored (and natural) parts. This helps customers in that parts having too low or too high shrinkage are not made leading to lower scrap rates. Furthermore, addition of nucleators, potassium stearate or Milliken HPN-20E, reduce this standard deviation further and are therefore more preferred.

In attempts to eliminate the need for a two-part construction, the use of different blends of polymers has been suggested. However, there is still a need for polymer formulations that can be injection molded into closure devices having acceptable properties, such as no need for liners to facilitate a seal, acceptable taste and odor, satisfactory stress crack resistance, and impact strength to prevent cap failure.

SUMMARY OF THE INVENTION

The instant invention is a high-density polyethylene composition, method of producing the same, injection molded articles made therefrom, and method of making such articles. The high-density polyethylene composition of the instant invention includes a first component, and a second component. The first component is a high molecular weight ethylene alpha-olefin copolymer having a density in the range of 0.920 to 0.946 g/cm$^3$, and a melt index ($I_{21.6}$) in the range of 1 to 15 g/10 minutes. The second component is a low molecular weight ethylene polymer having a density in the range of 0.965 to 0.980 g/cm$^3$, and a melt index ($I_2$) in the range of 30 to 1500 g/10 minutes. The high-density polyethylene composition has a melt index ($I_2$) of at least 1, a density in the range of 0.950 to 0.960 g/cm$^3$. The method of producing a high-density polyethylene composition includes the following steps: (1) introducing ethylene, and one or more alpha-olefin comonomers into a first reactor; (2) (co)polymerizing the ethylene in the presence of one or more alpha-olefin comonomers in the first reactor thereby producing a first component, wherein the first component being a high molecular weight ethylene alpha-olefin copolymer having a density in the range of 0.920 to 0.946 g/cm$^3$, and a melt index ($I_{21.6}$) in the range of 1 to 15 g/10 minutes; (3) introducing the first component and additional ethylene into a second reactor; (4) polymerizing the additional ethylene in the second reactor thereby producing a second component, wherein the second component being a low molecular weight ethylene polymer having a density in the range of 0.965 to 0.980 g/cm$^3$, and a melt index ($I_2$) in the range of 30 to 1500 g/10 minutes; and (5) thereby producing the high-density polyethylene composition, wherein the high-density polyethylene composition having a melt index ($I_2$) of at least 1, a density in the range of 0.950 to 0.960 g/cm$^3$. The injection molded articles according to instant invention comprise the above-described inventive high-density polyethylene composition, and such articles are made via injection molding.

In one embodiment, the instant invention provides a high-density polyethylene composition comprising a high molecular weight polyethylene alpha-olefin copolymer having a density in the range of 0.920 to 0.946 g/cm$^3$, and a melt index ($I_{21.6}$) in the range of 1 to 15 g/10 minutes, and a low molecular weight ethylene polymer having a density in the range of 0.965 to 0.980 g/cm$^3$, and a melt index (I$_2$) in the range of 30 to 1500 g/10 minutes, wherein the inventive high-density polyethylene composition having a melt index (I$_2$) of at least 1 g/10 minutes, a density in the range of 0.950 to 0.960 g/cm$^3$.

In an alternative embodiment, the instant invention further provides a method for producing a high-density polyethylene composition comprising the steps of: (1) introducing ethylene, and one or more alpha-olefin comonomers into a first reactor; (2) (co)polymerizing the ethylene in the presence of one or more alpha-olefin comonomers in the first reactor thereby producing a high molecular weight ethylene alpha-olefin copolymer having a density in the range of 0.920 to 0.946 g/cm$^3$, and a melt index (I$_{21}$) in the range of 1 to 15 g/10 minutes; (3) introducing the high molecular weight ethylene alpha-olefin copolymer and additional ethylene into a second reactor; (4) polymerizing the additional ethylene in the second reactor thereby producing a low molecular weight ethylene polymer having a density in the range of 0.965 to 0.980 g/cm$^3$, and a melt index (I$_2$) in the range of 30 to 1500 g/10 minutes; and (5) thereby producing the high-density polyethylene composition, wherein the high-density polyethylene composition having a melt index (I$_2$) of at least 1, a density in the range of 0.950 to 0.960 g/cm$^3$.

In another alternative embodiment, the instant invention provides an injection molded article comprising a high-density polyethylene composition, wherein the high-density polyethylene composition comprising a high molecular weight polyethylene alpha-olefin copolymer having a density in the range of 0.920 to 0.946 g/cm$^3$, and a melt index (I$_{21.6}$) in the range of 1 to 15 g/10 minutes, and a low molecular weight ethylene polymer having a density in the range of 0.965 to 0.980 g/cm$^3$, and a melt index (I$_2$) in the range of 30 to 1500 g/10 minutes, wherein the inventive high-density polyethylene composition having a melt index (I$_2$) of at least 1 g/10 minutes, a density in the range of 0.950 to 0.960 g/cm$^3$.

In another alternative embodiment, the instant invention provides a method of making an article comprising the steps of: (1) providing a high-density polyethylene composition comprising a high molecular weight ethylene alpha-olefin copolymer having a density in the range of 0.920 to 0.946 g/cm$^3$, and a melt index (I$_{21.6}$) in the range of 1 to 15 g/10 minutes; and a low molecular weight ethylene polymer having a density in the range of 0.965 to 0.980 g/cm$^3$, and a melt index (I$_2$) in the range of 30 to 1500 g/10 minutes; wherein the high-density polyethylene composition having a melt index (I$_2$) of at least 1 g/10 minutes, a density in the range of 0.950 to 0.960 g/cm$^3$; (2) injection molding the high-density polyethylene composition (3) thereby forming the article.

In an alternative embodiment, the instant invention provides a method for producing a high-density polyethylene composition, in accordance with any of the preceding embodiments except that the second reactor being substantially free of any other alpha-olefin copolymers.

In an alternative embodiment, the instant invention provides a high-density polyethylene composition, method of producing the same, articles made therefrom, and method of making such articles, in accordance with any of the preceding embodiments, except that the high-density polyethylene composition having a standard deviation of flow direction shrinkage of less than 7 percent across different colors.

In an alternative embodiment, the instant invention provides a high-density polyethylene composition, method of producing the same, articles made therefrom, and method of making such articles, in accordance with any of the preceding embodiments, except that the high-density polyethylene composition having a standard deviation of flow direction shrinkage of less than 6 percent across different colors.

In an alternative embodiment, the instant invention provides a high-density polyethylene composition, method of producing the same, articles made therefrom, and method of making such articles, in accordance with any of the preceding embodiments, except that the high-density polyethylene composition having a standard deviation of flow direction shrinkage of less than 4.5 percent across different colors.

In an alternative embodiment, the instant invention provides a high-density polyethylene composition, method of producing the same, articles made therefrom, and method of making such articles, in accordance with any of the preceding embodiments, except that the high-density polyethylene composition further comprising 100 to 10,000 ppm by weight of a nucleator. More preferred ranges include 200 to 5000 parts per million, even more preferred 300 to 3000 parts per million, an most preferred 400 to 2000 parts per million.

In an alternative embodiment, the instant invention provides a high-density polyethylene composition, method of producing the same, articles made therefrom, and method of making such articles, in accordance with any of the preceding embodiments, except that the high-density polyethylene composition further comprising 100 to 10,000 ppm by weight of potassium stearate or HPN-20E as a nucleator, wherein the inventive high-density polyethylene composition having a standard deviation of flow direction shrinkage of less than 4 percent across different colors.

In an alternative embodiment, the instant invention provides a high-density polyethylene composition, method of producing the same, articles made therefrom, and method of making such articles, in accordance with any of the preceding embodiments, except that the high-density polyethylene composition further comprising 100 to 10,000 ppm by weight of potassium stearate or HPN-20E as a nucleator, wherein the inventive high-density polyethylene composition having a standard deviation of flow direction shrinkage of less than 3 percent across different colors.

In an alternative embodiment, the instant invention provides a high-density polyethylene composition, method of producing the same, articles made therefrom, and method of making such articles, in accordance with any of the preceding embodiments, except that the high-density polyethylene composition further comprising 100 to 10,000 ppm by weight of potassium stearate or HPN-20E as a nucleator, wherein the inventive high-density polyethylene composition having a standard deviation of flow direction shrinkage of less than 2 percent across different colors.

In an alternative embodiment, the instant invention provides a high-density polyethylene composition, method of producing the same, articles made therefrom, and method of making such articles, in accordance with any of the preceding embodiments, except that the high-density polyethylene composition having a 1% secant modulus in psi of equal or greater to the following relationship. [(7,492,165*density (g/cm$^3$))−6,975,000] psi/(g/cm$^3$).

In an alternative embodiment, the instant invention provides a high-density polyethylene composition, method of producing the same, articles made therefrom, and method of making such articles, in accordance with any of the preceding embodiments, except that the high molecular weight polyethylene alpha-olefin copolymer having a density in the range of 0.925 to 0.945 g/cm$^3$.

In another alternative embodiment, the instant invention provides a high-density polyethylene composition, method of producing the same, articles made therefrom, and method of making such articles, in accordance with any of the preceding embodiments, except that the high molecular weight polyethylene alpha-olefin copolymer having a density in the range of 0.928 to 0.944 g/cm$^3$.

In another alternative embodiment, the instant invention provides a high-density polyethylene composition, method of producing the same, articles made therefrom, and method of making such articles, in accordance with any of the preceding embodiments, except that the high molecular weight polyethylene alpha-olefin copolymer having a melt index ($I_{21.6}$) in the range of 2 to 12 g/10 minutes.

In another alternative embodiment, the instant invention provides a high-density polyethylene composition, method of producing the same, articles made therefrom, and method of making such articles, in accordance with any of the preceding embodiments, except that the high molecular weight polyethylene alpha-olefin copolymer having a melt index ($I_{21.6}$) in the range of 2.5 to 11 g/10 minutes.

In another alternative embodiment, the instant invention provides a high-density polyethylene composition, method of producing the same, articles made therefrom, and method of making such articles, in accordance with any of the preceding embodiments, except that the low molecular weight ethylene polymer having a density in the range of 0.965 to 0.975 g/cm$^3$.

In another alternative embodiment, the instant invention provides a high-density polyethylene composition, method of producing the same, articles made therefrom, and method of making such articles, in accordance with any of the preceding embodiments, except that the low molecular weight ethylene polymer having a melt index ($I_2$) in the range of 40 to 1300 g/10 minutes.

In another alternative embodiment, the instant invention provides a high-density polyethylene composition, method of producing the same, articles made therefrom, and method of making such articles, in accordance with any of the preceding embodiments, except that the low molecular weight ethylene polymer having a melt index ($I_2$) in the range of 50 to 1000 g/10 minutes.

In another alternative embodiment, the instant invention provides a high-density polyethylene composition, method of producing the same, articles made therefrom, and method of making such articles, in accordance with any of the preceding embodiments, except that the high-density polyethylene composition having a melt index ($I_2$) in the range of 1 to 2 g/10 minutes; or in the alternative, having a melt index ($I_2$) of at least 2 g/10 minutes.

In another alternative embodiment, the instant invention provides a high-density polyethylene composition, method of producing the same, articles made therefrom, and method of making such articles, in accordance with any of the preceding embodiments, except that the high molecular weight ethylene alpha-olefin copolymer having a molecular weight in the range of 150,000 to 300,000.

In another alternative embodiment, the instant invention provides a high-density polyethylene composition, method of producing the same, articles made therefrom, and method of making such articles, in accordance with any of the preceding embodiments, except that the low molecular weight ethylene polymer having a molecular weight in the range of 12,000 to 45,000.

In another alternative embodiment, the instant invention provides a high-density polyethylene composition, method of producing the same, articles made therefrom, and method of making such articles, in accordance with any of the preceding embodiments, except that the high molecular weight polyethylene alpha-olefin copolymer having a density in the range of 0.928 to 0.944 g/cm$^3$, and a melt index ($I_{21.6}$) in the range of 2.5 to 11 g/10 minutes, and the low molecular weight ethylene polymer having a density in the range of 0.965 to 0.975 g/cm$^3$, and a melt index ($I_2$) in the range of 50 to 1000 g/10 minutes.

In another alternative embodiment, the instant invention provides a high-density polyethylene composition, method of producing the same, articles made therefrom, and method of making such articles, in accordance with any of the preceding embodiments, except that both the high molecular weight polyethylene alpha-olefin copolymer and the low molecular weight ethylene polymer being substantially free of any long chain branching.

In another alternative embodiment, the instant invention provides a high-density polyethylene composition, method of producing the same, articles made therefrom, and method of making such articles, in accordance with any of the preceding embodiments, except that the high-density polyethylene composition being substantially free of any long chain branching.

In another alternative embodiment, the instant invention provides a high-density polyethylene composition, method of producing the same, articles made therefrom, and method of making such articles, in accordance with any of the preceding embodiments, except that the high-density polyethylene composition having a single ATREF temperature peak, wherein the ATREF temperature peak having a temperature peak maximum between about 90° C. to about 105° C.; and wherein calculated purge fraction in the range of less than 15.5 percent.

In another alternative embodiment, the instant invention provides an article and a method of making such an article, in accordance with any of the preceding embodiments, except that the article having an environmental stress crack resistance of at least 10 hours measured via ASTM D-1693 condition B, 10% Igepal, or at least 100 hours measured via ASTM D-1693 condition B, 100% Igepal.

In another alternative embodiment, the instant invention provides an article and a method of making such an article, in accordance with any of the preceding embodiments, except that the article being a closure device.

In another alternative embodiment, the instant invention provides an injection molded article and a method of making such an article, in accordance with any of the preceding embodiments, except that the article being a bottle cap.

In another alternative embodiment, the instant invention provides an injection molded article and a method of making such an article, in accordance with any of the preceding embodiments, except that the article being a cap including a skirt that axially extends from the periphery of a base, and having internal threads for securing the cap to a container.

BRIEF DESCRIPTION OF THE DRAWINGS

For the purpose of illustrating the instant invention, there is shown in the drawings a form that is presently preferred; it being understood, however, that this invention is not limited to the precise arrangements and instrumentalities shown.

DETAILED DESCRIPTION OF THE INVENTION

Figure 1:
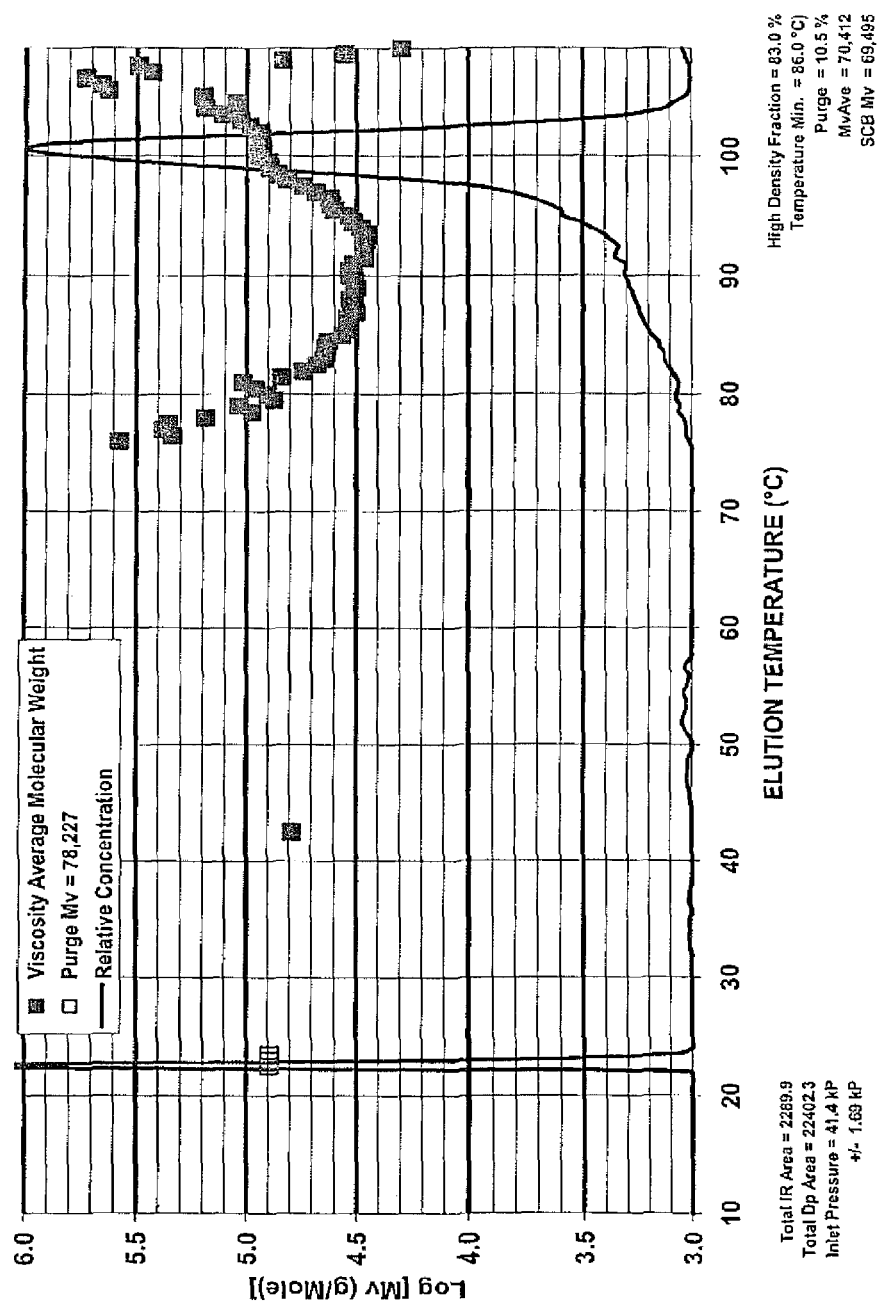
FIG. 1 is a graph illustrating how the calculated ATREF high-density fraction and purge fraction of the high molecular weight polyethylene component of the inventive Example 1 was determined.

The high-density polyethylene composition of the instant invention includes a first component, and a second component. The first component is preferably a high molecular weight ethylene alpha-olefin copolymer having a density in the range of 0.920 to 0.946 g/cm$^3$, and a melt index ($I_{21}$) of 1 to 15 g/10 minutes. The second component is preferably a low molecular weight ethylene polymer having a density in the range of 0.965 to 0.980 g/cm$^3$, and a melt index ($I_2$) in the range of 30 to 1500 g/10 minutes. The high-density polyethylene composition has a melt index ($I_2$) of at least 1 g/10 minutes, a density in the range of 0.950 to 0.960 g/cm$^3$. The high-density polyethylene composition may further include additional components, additives, or adjuvants. The high-density polyethylene composition is a bimodal polymer, or in the alternative, the high-density polyethylene is a multimodal polymer.

The term "bimodal," as used herein, means that the molecular weight distribution (MWD) in a Gel Permeation Chromatography (GPC) curve exhibits two component polymers, for example, two peaks or wherein one component polymer may even exist as a hump, shoulder, or tail relative to the MWD of the other component polymer; or in the alternative, for example, wherein the two components may have only one single peak with no bumps, shoulders, or tails.

The term "multimodal" as used herein means that the MWD in a GPC curve exhibits more than two component polymers, for example, three or more peaks or wherein one component polymer may even exist as a hump, shoulder, or tail, relative to the MWD of the other component polymers; or in the alternative, wherein three or more components may have only one single pick with no bumps, shoulders, or tails.

The term "polymer" is used herein to indicate a homopolymer, an interpolymer (or copolymer), or a terpolymer. The term "polymer," as used herein, includes interpolymers, such as, for example, those made by the copolymerization of ethylene with one or more $C_3$-$C_{20}$ alpha-olefin(s).

The term "interpolymer," as used herein, refers to polymers prepared by the polymerization of at least two different types of monomers. The generic term interpolymer thus includes copolymers, usually employed to refer to polymers prepared from two different types of monomers, and polymers prepared from more than two different types of monomers.

The term (co)polymerization, as used herein, refers to polymerization of ethylene in the presence of one or more alpha-olefin comonomers.

The first component is a polymer, for example a polyolefin. The first component is preferably be an ethylene polymer; for example, the first component is preferably a high molecular weight ethylene alpha-olefin copolymer. The first component is substantially free of any long chain branching. Substantially free of any long chain branching, as used herein, refers to an ethylene polymer preferably substituted with less than about 0.1 long chain branch per 1000 total carbons, and more preferably, less than about 0.01 long chain branch per 1000 total carbons. The presence of long chain branches is typically determined according to the methods known in the art, such as gel permeation chromatography coupled with low angle laser light scattering detector (GPC-LALLS) and gel permeation chromatography coupled with a differential viscometer detector (GPC-DV). The first component has a density in the range of 0.920 to 0.946 g/cm$^3$. All individual values and subranges from 0.920 to 0.946 g/cm$^3$ are included herein and disclosed herein; for example, the first component has a density in the range of 0.925 to 0.945 g/cm$^3$, or in the alternative, the first component has a density in the range of 0.928 to 0.944 g/cm$^3$. The first component has a melt index ($I_{21.6}$); in the range of 1 to 15 g/10 minutes. All individual values and subranges from 1 to 15 g/10 minutes are included herein and disclosed herein; for example, the first component has a melt index ($I_{21.6}$) in the range of 2 to 12 g/10 minutes, or in the alternative, the first component has a melt index ($I_{21.6}$) in the range of 2.5 to 11 g/10 minutes. The first component has molecular weight in the range of 150,000 to 300,000. All individual values and subranges from 150,000 to 300,000 are included herein and disclosed herein; for example, the first component has a molecular weight in the range of 150,000 to 270,000; or in the alternative, the first component has a molecular weight in the range of 150,000 to 240,000. The first component may comprise any amount of one or more alpha-olefin copolymers; for example, the first component comprises about less than 10 percent by weight of one or more alpha-olefin comonomers, based on the weight of the first component. All individual values and subranges less than 10 weight percent are included herein and disclosed herein. The first component may comprise any amount of ethylene; for example, the first component comprises at least about 90 percent by weight of ethylene, based on the weight of the first component. All individual values and subranges above 90 weight percent are included herein and disclosed herein; for example, the first component comprises at least 95 percent by weight of ethylene, based on the weight of the first component.

The alpha-olefin comonomers typically have no more than 20 carbon atoms. For example, the alpha-olefin comonomers may preferably have 3 to 10 carbon atoms, and more preferably 3 to 8 carbon atoms. Exemplary alpha-olefin comonomers include, but are not limited to, propylene, 1-butene, 1-pentene, 1-hexene, 1-heptene, 1-octene, 1-nonene, 1-decene, and 4-methyl-1-pentene. The alpha-olefin comonomers are preferably selected from the group consisting of propylene, 1-butene, 1-hexene, and 1-octene, and more preferably from the group consisting of 1-hexene and 1-octene.

The second component is a polymer, for example a polyolefin. The second component is preferably an ethylene polymer; for example, the second component is preferably a low molecular weight ethylene homopolymer. The ethylene homopolymer may contain trace amounts of contaminate comonomers, e.g. alpha-olefin comonomers. The term ethylene homopolymer, as used herein, refers to an ethylene polymer containing at least 99 percent by weight of ethylene units. The second component is preferably substantially free of any long chain branching. Substantially free of any long chain branching, as used herein, refers to an ethylene polymer preferably substituted with less than about 0.1 long chain branch per 1000 total carbons, and more preferably, less than about 0.01 long chain branch per 1000 total carbons. The presence of long chain branches is typically determined according to the methods known in the art, as mentioned above. The second component has a density in the range of 0.965 to 0.980 g/cm$^3$. All individual values and subranges from 0.965 to 0.980 g/cm$^3$ are included herein and disclosed herein; for example, the second component has a density in the range of 0.965 to 0.975 g/cm$^3$. The second component has a melt index ($I_2$) in the range of 30 to 1500 g/10 minutes. All individual values and subranges from 30 to 1500 g/10 minutes are included herein and disclosed herein; for example, the second component has a melt index ($I_2$) in the range of 40 to 1300 g/10 minutes; or in the alternative, the second component has a melt index ($I_2$) in the range of 50 to 1000 g/10 minutes. The second component has a molecular weight in the range of 12,000 to 45,000. All individual values and subranges from 12,000 to 45,000 are included herein and disclosed herein; for example, the second component has a molecular weight in the range of 15,000 to 45,000; or in the alternative, the second component has a molecular weight in the range of 20,000 to 45,000. The second component comprises less than 1.00 percent by weight of one or more additional alpha-olefin copolymers, based on the weight of the second component. All individual values and subranges from less than 1.00 weight percent are included herein and disclosed herein; for example, the second component may comprise about 0.0001 to about 1.00 percent by weight of one or more additional alpha-olefin copolymers; the second component may comprise about 0.001 to about 1.00 percent by weight of one or more additional alpha-olefin copolymers; or in the alternative, the second component is free of any additional alpha-olefin copolymers. The second component comprises at least about 99 percent by weight of ethylene, based on the weight of the second component. All individual values and subranges from about 99 to about 100 weight percent are included herein and disclosed herein; for example, the second component comprises about 99.5 to about 100 percent by weight of ethylene, based on the weight of the second component.

The high-density polyethylene composition has a density in the range of 0.950 to 0.960 g/cm$^3$. All individual values and subranges from 0.950 to 0.960 g/cm$^3$ are included herein and disclosed herein. The high-density polyethylene composition has a melt index ($I_2$) of at least 1 g/10 minutes. All individual values and subranges equal or greater than 1 g/10 minutes are included herein and disclosed herein; for example, the high-density polyethylene composition has a melt index ($I_2$) in the range of 1 to 2 g/10 minutes; or in the alternative, the high-density polyethylene composition has a melt index ($I_2$) of at least 2 g/10 minutes. The high-density polyethylene composition is substantially free of any long chain branching. Substantially free of any long chain branching, as used herein, refers to a polyethylene composition preferably substituted with less than about 0.1 long chain branch per 1000 total carbons, and more preferably, less than about 0.01 long chain branch per 1000 total carbons. The presence of long chain branches is typically determined according to the methods known in the art, as mentioned above. The high-density polyethylene composition has a molecular weight distribution in the range of 4 to 15. All individual values and subranges from 4 to 15 are included herein and disclosed herein; for example, the high-density polyethylene composition has a molecular weight distribution in the range of 5 to 13; or in the alternative, the high-density polyethylene composition has a molecular weight distribution in the range of 5 to 11. The term molecular weight distribution or "MWD," as used herein, refers to the ratio of weight average molecular weight ($M_w$) to number average molecular weight ($M_n$), i.e. ($M_w/M_n$), described in further details hereinbelow. The high-density polyethylene composition has an environmental stress crack resistance of at least 10 hours measured via ASTM D-1693, Condition B, 10% Igepal, or preferably at least 20 hours measured via ASTM D-1693, Condition B, 10% Igepal, or more preferably, at least 40 hours measured via ASTM D-1693, Condition B, 10% Igepal. In the alternative, the high-density polyethylene composition has an environmental stress crack resistance of at least 100 hours measured via ASTM D-1693, Condition B, 100% Igepal, or preferably, at least 125 hours measured via ASTM D-1693, Condition B, 100% Igepal, or more preferably, at least 150 hours measured via ASTM D-1693, Condition B, 100% Igepal. The high-density polyethylene composition may comprise any amounts of first component, second component, or combinations thereof. The high-density polyethylene composition comprises about 40 to about 65 percent by weight of the first component, based on the total weight of the first and second components. All individual values and subranges from about 40 to about 65 weight percent are included herein and disclosed herein; for example, the high-density polyethylene composition comprises about 42 to about 64 percent by weight of the first component, based on the total weight of first and second components. The high-density polyethylene composition further comprises about 35 to about 60 percent by weight of the second component, based on the total weight of the first and second components. All individual values and subranges from about 35 to about 60 weight percent are included herein and disclosed herein; for example, the high-density polyethylene composition further comprises about 36 to about 58 percent by weight of the second component, based on the total weight of the first and second components. Preferably, the high-density polyethylene composition has a single ATREF temperature peak, wherein the ATREF temperature peak having a temperature peak maximum between about 90° C. to about 105° C. The high-density polyethylene composition further has a calculated purge fraction in the range of less than 15.5 percent.

The high-density polyethylene composition may further include additional components such as other polymers, adjuvants, and/or additives. Such adjuvants or additives include, but are not limited to, antistatic agents, color enhancers, dyes, lubricants, fillers, pigments, primary antioxidants, secondary antioxidants, processing aids, UV stabilizers, nucleators, and combinations thereof. The high-density polyethylene composition compromises about less than 10 percent by the combined weight of one or more additives, based on the weight of the high-density polyethylene composition. All individual values and subranges from about less than 10 weight percent are included herein and disclosed herein; for example, the high-density polyethylene composition comprises about less than 5 percent by the combined weight of one or more additives, based on the weight of the high-density polyethylene composition; or in the alternative, the high-density polyethylene composition comprises about less than 1 percent by the combined weight of one or more additives, based on the weight of the high-density polyethylene composition; or in another alternative, the high-density polyethylene composition may compromise about less than 0.5 percent by the combined weight of one or more additives, based on the weight of the high-density polyethylene composition. Nucleators include, but are not limited to, potassium stearate, HPN-20E, which is commercially available from Milliken. Antioxidants, such as Irgafos® 168 and Irganox® 1010, are commonly used to protect the polymer from thermal and/or oxidative degradation. Irganox® 1010 is tetrakis (methylene (3,5-di-tert-butyl-4hydroxyhydrocinnamate), which is commercially available from Ciba Geigy Inc. Irgafos® 168 is tris (2,4 di-tert-butylphenyl) phosphite, which is commercially available from Ciba Geigy Inc.

The inventive high-density polyethylene composition may further be blended with other polymers. Such other polymers are generally known to a person of ordinary skill in the art. Blends comprising the inventive high-density polyethylene composition is formed via any conventional methods. For example, the selected polymers are melt blended via a single or twin screw extruder, or a mixer, e.g. a Banbury mixer, a Haake mixer, a Barbender internal mixer.

In general, blends containing the inventive high-density polyethylene composition comprises at least 40 percent by weight of the inventive high-density polyethylene composition, based on the total weight of the blend. All individual values and subranges in the range of at least 40 weight percent are included herein and disclosed herein; for example, the blend comprises at least 50 percent by weight of the inventive high-density polyethylene composition, based on the total weight of the blend; or in the alternative, the blend comprises at least 60 percent by weight of the inventive high-density polyethylene composition, based on the total weight of the blend; or in the alternative, the blend comprises at least 70 percent by weight of the inventive high-density polyethylene composition, based on the total weight of the blend; or in the alternative, the blend comprises at least 80 percent by weight of the inventive high-density polyethylene composition, based on the total weight of the blend; or in the alternative, the blend comprises at least 90 percent by weight of the inventive high-density polyethylene composition, based on the total weight of the blend; or in the alternative, the blend comprises at least 95 percent by weight of the inventive high-density polyethylene composition, based on the total weight of the blend; or in the alternative, the blend comprises at least 99.99 percent by weight of the inventive high-density polyethylene composition, based on the total weight of the blend.

Different polymerization reactions and catalyst systems may be employed to produce the inventive high-density polyethylene composition. Typical transition metal catalyst systems used to prepare the high-density polyethylene composition are magnesium/titanium based catalyst systems, exemplified by the catalyst system described in U.S. Pat. No. 4,302,565; vanadium based catalyst systems, such as those described in U.S. Pat. Nos. 4,508,842; 5,332,793; 5,342,907; and 5,410,003; and a metallocene catalyst system, such as those described in U.S. Pat. Nos. 4,937,299; 5,317,036; and 5,527,752. Catalyst systems that use molybdenum oxides on silica-alumina supports are also useful. Preferred catalyst systems for preparing the components for the inventive high-density polyethylene composition are Ziegler-Natta catalyst systems and metallocene catalyst systems.

In some embodiments, preferred catalysts used in the process to make the high-density polyethylene compositions are of the magnesium/titanium type. In particular, for the gas phase polymerizations, the catalyst is made from a precursor comprising magnesium and titanium chlorides in an electron donor solvent. This solution is often either deposited on a porous catalyst support, or a filler is added, which, on subsequent spray drying, provides additional mechanical strength to the particles. The solid particles from either support methods are often slurried in a diluent producing a high viscosity mixture, which is then used as catalyst precursor. Exemplary catalyst types are described in U.S. Pat. Nos. 6,187,866 and 5,290,745, the entire contents of both of which are herein incorporated by reference. Precipitated/crystallized catalyst systems, such as those described in U.S. Pat. Nos. 6,511,935 and 6,248,831, the entire contents of both of which are herein incorporated by reference, may also be used. Such catalysts may further be modified with one precursor activator. Such further modifications are described in US patent publication No.: US2006/0287445 A1.

Preferably the catalyst precursor has the formula $Mg_dTi(OR)_eX_f(ED)_g$ wherein R is an aliphatic or aromatic hydrocarbon radical having 1 to 14 carbon atoms or COW wherein R' is a aliphatic or aromatic hydrocarbon radical having 1 to 14 carbon atoms; each OR group is the same or different; X is independently chlorine, bromine or iodine; ED is an electron donor; d is 0.5 to 56; e is 0, 1, or 2; f is 2 to 116; and g is >2 and up to 1.5*d+3. It is prepared from a titanium compound, a magnesium compound, and an electron donor.

The electron donor is an organic Lewis base, liquid at temperatures in the range of 0° C. to 200° C., in which the magnesium and titanium compounds are soluble. The electron donor compounds are sometimes also referred to as Lewis bases. The electron donor can be an alkyl ester of an aliphatic or aromatic carboxylic acid, an aliphatic ketone, an aliphatic amine, an aliphatic alcohol, an alkyl or cycloalkyl ether, or mixtures thereof, each electron donor having 2 to 20 carbon atoms. Among these electron donors, the preferred are alkyl and cycloalkyl ethers having 2 to 20 carbon atoms; dialkyl, diaryl, and alkylaryl ketones having 3 to 20 carbon atoms; and alkyl, alkoxy, and alkylalkoxy esters of alkyl and aryl carboxylic acids having 2 to 20 carbon atoms. The most preferred electron donor is tetrahydrofuran. Other examples of suitable electron donors are methyl formate, ethyl acetate, butyl acetate, ethyl ether, dioxane, di-n-propyl ether, dibutyl ether, ethanol, 1-butanol, ethyl formate, methyl acetate, ethyl anisate, ethylene carbonate, tetrahydropyran, and ethyl propionate.

While a large excess of electron donor may be used initially to provide the reaction product of titanium compound and electron donor, the final catalyst precursor contains approximately 1 to approximately 20 moles of electron donor per mole of titanium compound and preferably approximately 1 to approximately 10 moles of electron donor per mole of titanium compound.

Since the catalyst will act as a template for the growth of the polymer, it is essential that the catalyst precursor be converted into a solid. It is also essential that the resultant solid has the appropriate particle size and shape to produce polymer particles with relatively narrow size distribution, low amounts of fines and good fluidization characteristics.

Although this solution of Lewis Base, magnesium and titanium compounds may be impregnated into a porous support and dried to form a solid catalyst; it is preferred that the solution be converted into a solid catalyst via spray drying. Each of these methods thus forms a "supported catalyst precursor."

The spray dried catalyst product is then preferentially placed into a mineral oil slurry. The viscosity of the hydrocarbon slurry diluent is sufficiently low, so that the slurry can be conveniently pumped through the pre-activation apparatus, and eventually into the polymerization reactor. The catalyst is fed using a slurry catalyst feeder. A progressive cavity pump, such as a Moyno pump is typically used in commercial reaction systems, while a dual piston syringe pump is typically used in pilot scale reaction systems, where the catalyst flows are less than, or equal to, 10 cm$^3$/hour ($2.78 \times 10^{-9}$ m$^3$/s) of slurry.

A cocatalyst, or activator, is also fed to the reactor to effect the polymerization. Complete activation by additional cocatalyst is required to achieve full activity. The complete activation normally occurs in the polymerization reactor, although the techniques taught in EP 1,200,483 may also be used.

The cocatalysts, which are reducing agents, conventionally used, are comprised of aluminum compounds, but compounds of lithium, sodium and potassium, alkaline earth metals, as well as compounds of other earth metals than aluminum are possible. The compounds are usually hydrides, organometal or halide compounds. Butyl lithium and dibutyl magnesium are examples of useful compounds of other than aluminum.

An activator compound, which is generally used with any of the titanium based catalyst precursors, can have the formula $AlR_aX_bH_c$, wherein each X is independently chlorine, bromine, iodine, or OR'; each R and R' is independently a saturated aliphatic hydrocarbon radical having 1 to 14 carbon atoms; b is 0 to 1.5; c is 0 or 1; and a+b+c=3. Preferred activators include alkylaluminum mono- and dichlorides, wherein each alkyl radical has 1 to 6 carbon atoms and the trialkylaluminums. Examples are diethylaluminum chloride and tri-n-hexylaluminum. About 0.10 to 10 moles, and preferably 0.15 to 2.5 moles, of activator are used per mole of electron donor. The molar ratio of activator to titanium is in the range from 1:1 to 10:1, and is preferably in the range from 2:1 to 5:1.

The hydrocarbyl aluminum cocatalyst can be represented by the formula $R_3Al$ or $R_2AlX$, wherein each R is independently alkyl, cycloalkyl, aryl, or hydrogen; at least one R is hydrocarbyl; and two or three R radicals can be joined to form a heterocyclic structure. Each R, which is a hydrocarbyl radical, can have 1 to 20 carbon atoms, and preferably has 1 to 10 carbon atoms. X is a halogen, preferably chlorine, bromine, or iodine. Examples of hydrocarbyl aluminum compounds are as follows: triisobutylaluminum, tri-n-hexylaluminum, di-isobutyl-aluminum hydride, dihexylaluminum hydride, di-isobutylhexylaluminum, isobutyl dihexylaluminum, trimethylaluminum, triethylaluminum, tripropylaluminum, triisopropylaluminum, tri-n-butylaluminum, trioctylaluminum, tridecylaluminum, tridodecylaluminum, tribenzylaluminum, triphenylaluminum, trinaphthylaluminum, tritolylaluminum, dibutylaluminum chloride, diethylaluminum chloride, and ethylaluminum sesquichloride. The cocatalyst compounds can also serve as activators and modifiers.

Activators can be added to the precursor either before and/or during polymerization. In one procedure, the precursor is fully activated before polymerization. In another procedure, the precursor is partially activated before polymerization, and activation is completed in the reactor. Where a modifier is used instead of an activator, the modifiers are usually dissolved in an organic solvent such as isopentane and, where a support is used, impregnated into the support following impregnation of the titanium compound or complex, after which the supported catalyst precursor is dried. Otherwise, the modifier solution is added by itself directly to the reactor. Modifiers are similar in chemical structure and function to the activators as are cocatalysts. For variations, see for example, U.S. Pat. No. 5,106,926, incorporated herein by reference in its entirety. The cocatalyst is preferably added separately neat or as a solution in an inert solvent, such as isopentane, to the polymerization reactor at the same time as the flow of ethylene is initiated.

In those embodiments that use a support, the precursor is supported on an inorganic oxide support such as silica, aluminum phosphate, alumina, silica/alumina mixtures, silica that has been modified with an organoaluminum compound such as triethyl aluminum, and silica modified with diethyl zinc. In some embodiments silica is a preferred support. A typical support is a solid, particulate, porous material essentially inert to the polymerization. It is used as a dry powder having an average particle size of 10 to 250 μm and preferably 30 to 100 μm; a surface area of at least 200 m$^2$/g and preferably at least 250 m$^2$/g; and a pore size of at least $100 \times 10^{-10}$ m and preferably at least $200 \times 10^{-10}$ m. Generally, the amount of support used is that which will provide 0.1 to 1.0 millimole of titanium per gram of support and preferably 0.4 to 0.9 millimole of titanium per gram of support. Impregnation of the above mentioned catalyst precursor into a silica support can be accomplished by mixing the precursor and silica gel in the electron donor solvent or other solvent followed by solvent removal under reduced pressure. When a support is not desired, the catalyst precursor can be used in liquid form.

In another embodiment, metallocene catalysts, single-site catalysts and constrained geometry catalysts may be used in the practice of the invention. Generally, metallocene catalyst compounds include half and full sandwich compounds having one or more π-bonded ligands including cyclopentadienyl-type structures or other similar functioning structure such as pentadiene, cyclooctatetraendiyl and imides. Typical compounds are generally described as containing one or more ligands capable of π-bonding to a transition metal atom, usually, cyclopentadienyl derived ligands or moieties, in combination with a transition metal selected from Group 3 to 8, preferably 4, 5 or 6 or from the lanthanide and actinide series of the Periodic Table of Elements.

Exemplary of metallocene-type catalyst compounds are described in, for example, U.S. Pat. Nos. 4,530,914; 4,871,705; 4,937,299; 5,017,714; 5,055,438; 5,096,867; 5,120,867; 5,124,418; 5,198,401; 5,210,352; 5,229,478; 5,264,405; 5,278,264; 5,278,119; 5,304,614; 5,324,800; 5,347,025; 5,350,723; 5,384,299; 5,391,790; 5,391,789; 5,399,636; 5,408,017; 5,491,207; 5,455,366; 5,534,473; 5,539,124; 5,554,775; 5,621,126; 5,684,098; 5,693,730; 5,698,634; 5,710,297; 5,712,354; 5,714,427; 5,714,555; 5,728,641; 5,728,839; 5,753,577; 5,767,209; 5,770,753 and 5,770,664; European publications: EP-A-0 591 756; EP-A-0 520 732; EP-A-0 420 436; EP-A-0 485 822; EP-A-0 485 823; EP-A-0 743 324; EP-A-0 518 092; and PCT publications: WO 91/04257; WO 92/00333; WO 93/08221; WO 93/08199; WO 94/01471; WO 96/20233; WO 97/15582; WO 97/19959; WO 97/46567; WO 98/01455; WO 98/06759 and WO 98/011144. All of these references are incorporated herein, in their entirety, by reference.

Suitable catalysts for use herein, preferably include constrained geometry catalysts as disclosed in U.S. Pat. Nos. 5,272,236 and 5,278,272, which are both incorporated, in their entirety, by reference.

The monocyclopentadienyl transition metal olefin polymerization catalysts taught in U.S. Pat. No. 5,026,798, the teachings of which are incorporated herein by reference, are also suitable as catalysts of the invention.

The foregoing catalysts may be further described as comprising a metal coordination complex comprising a metal of groups 3-10 or the Lanthanide series of the Periodic Table of the Elements, and a delocalized π-bonded moiety, substituted with a constrain-inducing moiety. Such a complex has a constrained geometry about the metal atom. The catalyst further comprises an activating cocatalyst.

Any conventional ethylene homopolymerization or (co) polymerization reactions may be employed to produce the inventive high-density polyethylene composition. Such conventional ethylene homopolymerization or (co)polymerization reactions include, but are not limited to, gas phase polymerization, slurry phase polymerization, liquid phase polymerization, and combinations thereof using conventional reactors, e.g. gas phase reactors, loop reactors, stirred tank reactors, and batch reactors in series, or in series and parallel. The polymerization system of the instant invention is a dual sequential polymerization system or a multi-sequential polymerization system. Examples of dual sequential polymerization system include, but are not limited to, gas phase polymerization/gas phase polymerization; gas phase polymerization/liquid phase polymerization; liquid phase polymerization/gas phase polymerization; liquid phase polymerization/liquid phase polymerization; slurry phase polymerization/slurry phase polymerization; liquid phase polymerization/slurry phase polymerization; slurry phase polymerization/liquid phase polymerization; slurry phase polymerization/gas phase polymerization; and gas phase polymerization/slurry phase polymerization. The multi-sequential polymerization systems includes at least three polymerization reactions. The catalyst system, described above, may also be a conventional catalyst system. The inventive high-density polyethylene composition is preferably produced via a dual gas phase polymerization process, e.g. gas phase polymerization/gas phase polymerization; however, the instant invention is not so limited, and any of the above combinations may be employed.

In production, a dual sequential polymerization system connected in series, as described above, may be used. The first component, i.e. the high molecular weight ethylene polymer, can be produced in the first stage of the dual sequential polymerization system, and the second component, i.e. the low molecular weight ethylene polymer, can be prepared in the second stage of the dual sequential polymerization system. Alternatively, the second component, i.e. the low molecular weight ethylene polymer, can be made in the first stage of the dual sequential polymerization system, and the first component, i.e. the high molecular weight ethylene polymer, can be made in the second stage of the dual sequential polymerization system.

For purposes of the present disclosure, the reactor, in which the conditions are conducive to making the first component is known as the first reactor. Alternatively, the reactor in which the conditions are conducive to making the second component is known as the second reactor.

In production, a catalyst system including a cocatalyst, ethylene, one or more alpha-olefin comonomers, hydrogen, and optionally inert gases and/or liquids, e.g. $N_2$, isopentane, and hexane, are continuously fed into a first reactor, which is connected to a second reactor in series; the first component/active catalyst mixture is then continuously transferred, for example, in batches from the first reactor to the second reactor. Ethylene, hydrogen, cocatalyst, and optionally inert gases and/or liquids, e.g. $N_2$, isopentane, hexane, are continuously fed to the second reactor, and the final product, i.e. the inventive high-density polyethylene composition, is continuously removed, for example, in batches from the second reactor. A preferred mode is to take batch quantities of first component from the first reactor, and transfer these to the second reactor using the differential pressure generated by a recycled gas compression system. The inventive high-density polyethylene composition is then transferred to a purge bin under inert atmosphere conditions. Subsequently, the residual hydrocarbons are removed, and moisture is introduced to reduce any residual aluminum alkyls and any residual catalysts before the inventive high-density polyethylene composition is exposed to oxygen. The inventive high-density polyethylene composition is then transferred to an extruder to be pelletized. Such pelletization techniques are generally known. The inventive high-density polyethylene composition may further be melt screened. Subsequent to the melting process in the extruder, the molten composition is passed through one or more active screens (positioned in series of more than one) with each active screen having a micron retention size of from about 2 to about 400 (2 to $4\times10^{-5}$ m), and preferably about 2 to about 300 (2 to $3\times10^{-5}$ m), and most preferably about 2 to about 70 (2 to $7\times10^{-6}$ m), at a mass flux of about 5 to about 100 lb/hr/in$^2$ (1.0 to about 20 kg/s/m$^2$). Such further melt screening is disclosed in U.S. Pat. No. 6,485,662, which is incorporated herein by reference to the extent that it discloses melt screening.

In an alternative production, a multi-sequential polymerization system connected in series and parallel, as described above, may be used. In one embodiment of the instant invention, a catalyst system including a cocatalyst, ethylene, one or more alpha-olefin comonomers, hydrogen, and optionally inert gases and/or liquids, e.g. $N_2$, isopentane, and hexane, are continuously fed into a first reactor, which is connected to a second reactor, wherein the second reactor is connected to a third reactor in series; the first component/active catalyst mixture is then continuously transferred, for example, in batches from the first reactor to the second reactor, and then to the third reactor. Ethylene, hydrogen, cocatalyst, and optionally inert gases and/or liquids, e.g. $N_2$, isopentane, and hexane, are continuously fed to the second and third reactors, and the final product, i.e. high-density polyethylene composition, is continuously removed, for example, in batches from the third reactor. A preferred mode is to take batch quantities of first component from the first reactor, and transfer these to the second reactor, and then take batches from the second reactor and transfer these to the third reactor in series using the differential pressure generated by a recycled gas compression system. Alternatively, the first reactor may feed to both a second reactor and a third reactor in parallel, and the product from first reactor may be transferred to either second or third reactor. The high-density polyethylene composition is then transferred to a purge bin under inert atmosphere conditions. Subsequently, the residual hydrocarbons are removed, and moisture may be introduced to reduce any residual aluminum alkyls and any residual catalysts before the polymer, i.e. the inventive high-density polyethylene composition, is exposed to oxygen. The inventive high-density polyethylene composition is then transferred to an extruder to be pelletized. Such pelletization techniques are generally known. The inventive high-density polyethylene composition may further be melt screened. Subsequent to the melting process in the extruder, the molten composition is passed through one or more active screens (positioned in series of more than one) with each active screen having a micron retention size of from about 2 to about 400 (2 to 4×10$^{-5}$ m), and preferably about 2 to about 300 (2 to 3×10$^{-5}$ m), and most preferably about 2 to about 70 (2 to 7×10$^{-6}$ m), at a mass flux of about 5 to about 100 lb/hr/in$^2$ (1.0 to about 20 kg/s/m$^2$). Such further melt screening is disclosed in U.S. Pat. No. 6,485,662, which is incorporated herein by reference to the extent that it discloses melt screening.

In another alternative production, the inventive high-density polyethylene composition may be produced from polymers made in two or more independent reactors (each using the same or different catalyst) with post reaction blending.

In application, the inventive high-density polyethylene composition may be used to manufacture shaped articles. Such articles may include, but are not limited to, closure devices, e.g. bottle caps. Different methods may be employed to manufacture articles such as bottle caps. Suitable conversion techniques include, but are not limited to, injection molding.

In injection molding process, the inventive high-density polyethylene composition is fed into an extruder via a hopper. The extruder conveys, heats, melts, and pressurizes the inventive high-density polyethylene composition to a form a molten stream. The molten stream is forced out of the extruder through a nozzle into a relatively cool mold held closed under pressure thereby filling the mold. The melt cools and hardens until fully set-up. The mold then opens and the molded article, e.g. bottle cap, is removed. The injection molded cap may include a skirt that axially extends from the periphery of a base, and may further include internal threads for securing the cap to a container.

Closure devices, e.g. bottle caps, including the inventive high-density polyethylene composition exhibit improved environmental crack resistance. Such bottle caps are adapted to withstand the pressure of carbonated drinks. Such bottle caps further facilitate closure, and sealing of a bottle, i.e. optimum torque provided by a machine to screw the cap on the bottle, or unsealing a bottle, i.e. optimum torque provide by a person to unscrew the cap.

EXAMPLES

It is understood that the present invention is operable in the absence of any component, which has not been specifically disclosed. The following examples are provided in order to further illustrate the invention and are not to be construed as limiting.

Inventive Examples 1-6

Figure 2:
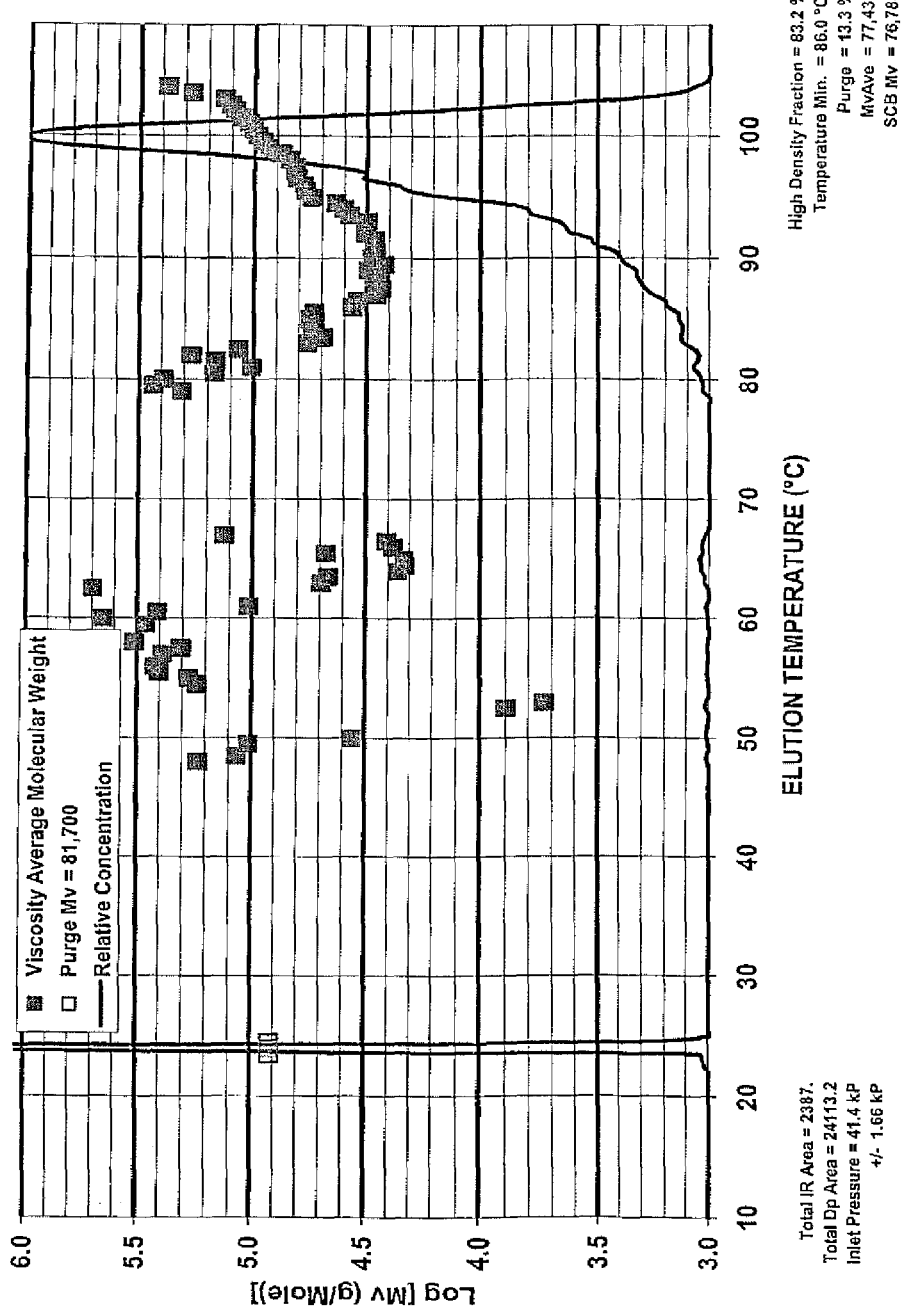
FIG. 2 is a graph illustrating how the calculated ATREF high-density fraction and purge fraction of the high molecular weight polyethylene component of the inventive Example 2 was determined.
Figure 3:
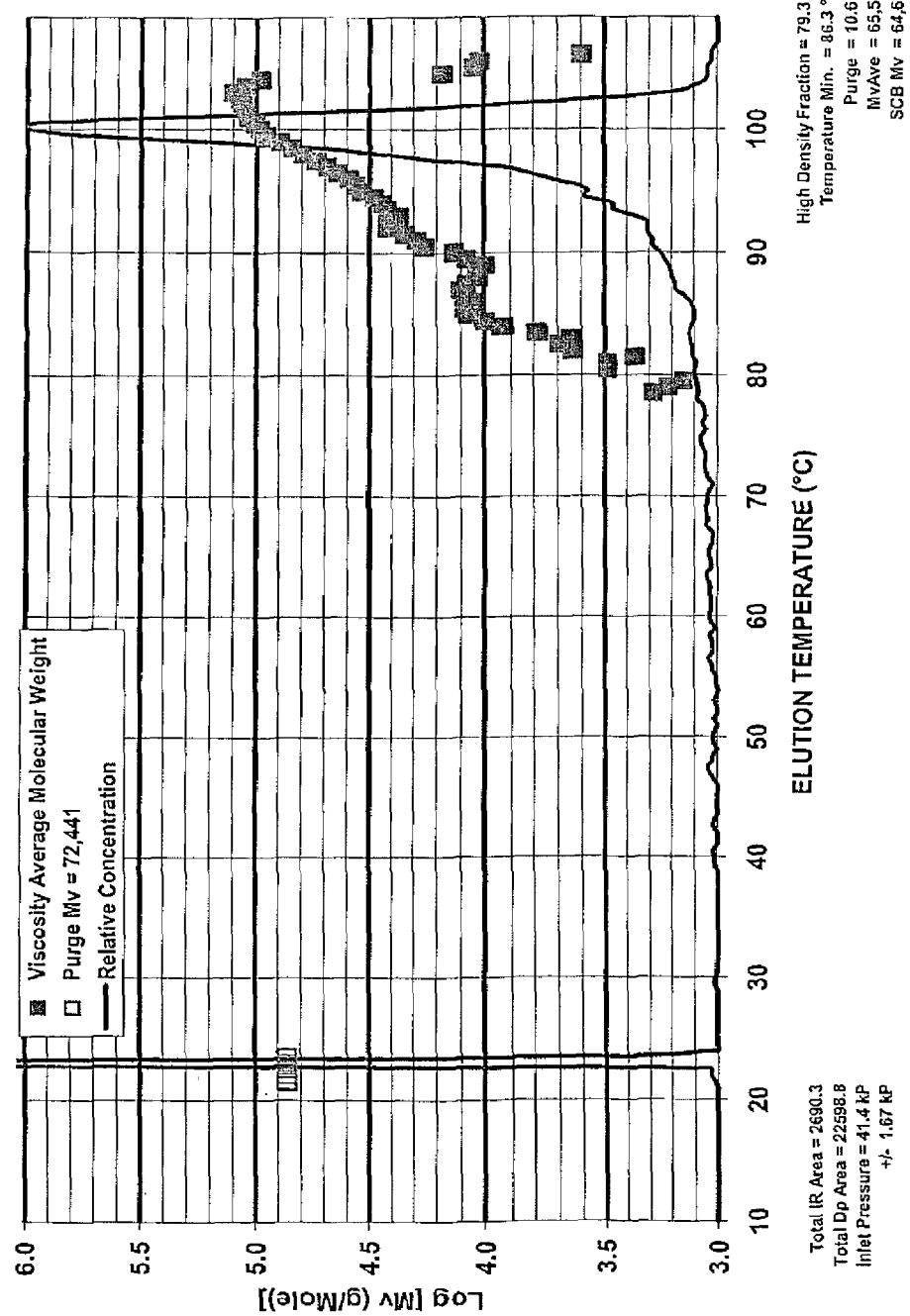
FIG. 3 is a graph illustrating how the calculated ATREF high-density fraction and purge fraction of the high molecular weight polyethylene component of the inventive Example 3 was determined.
Figure 4:
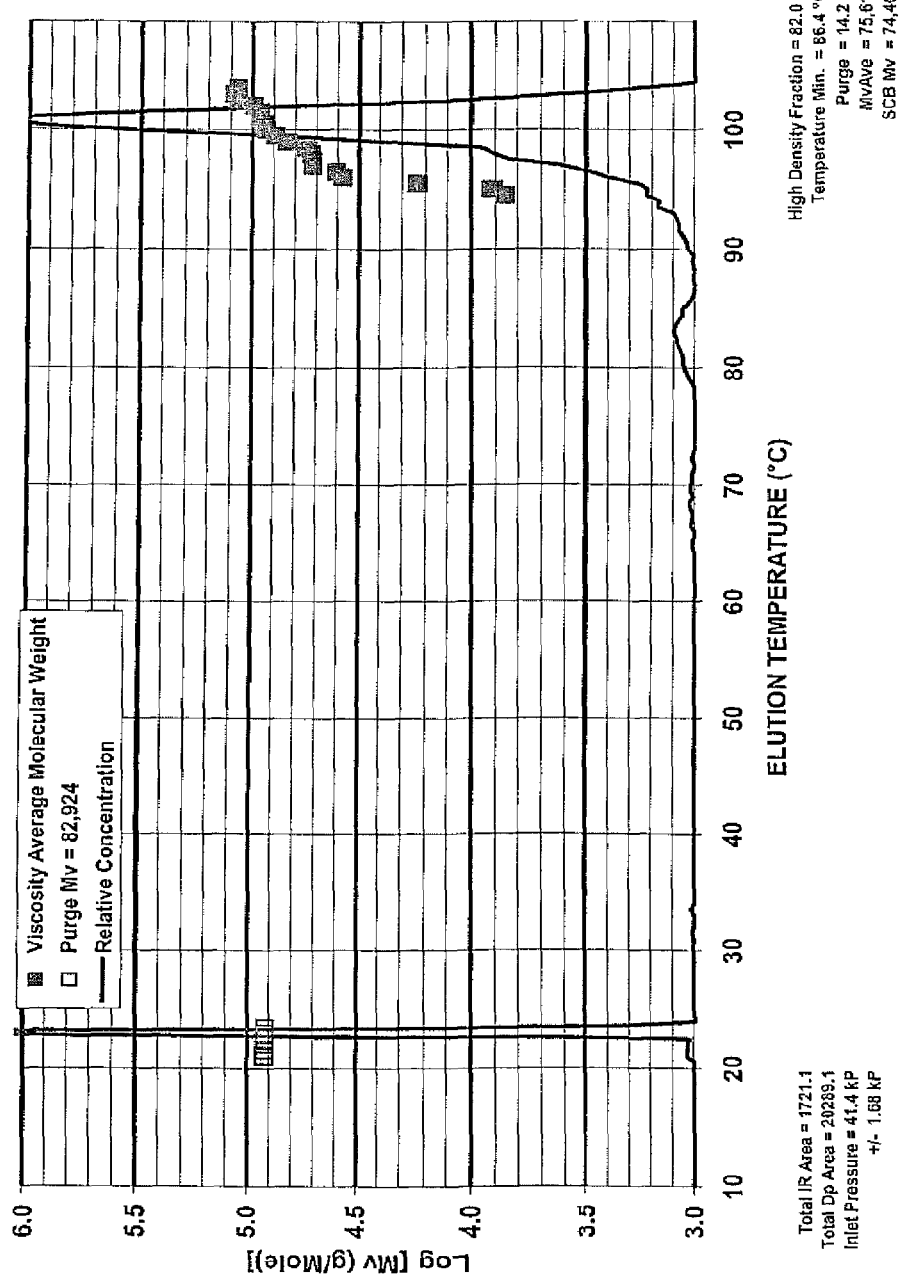
FIG. 4 is a graph illustrating how the calculated ATREF high-density fraction and purge fraction of the high molecular weight polyethylene component of the inventive Example 4 was determined.
Figure 5:
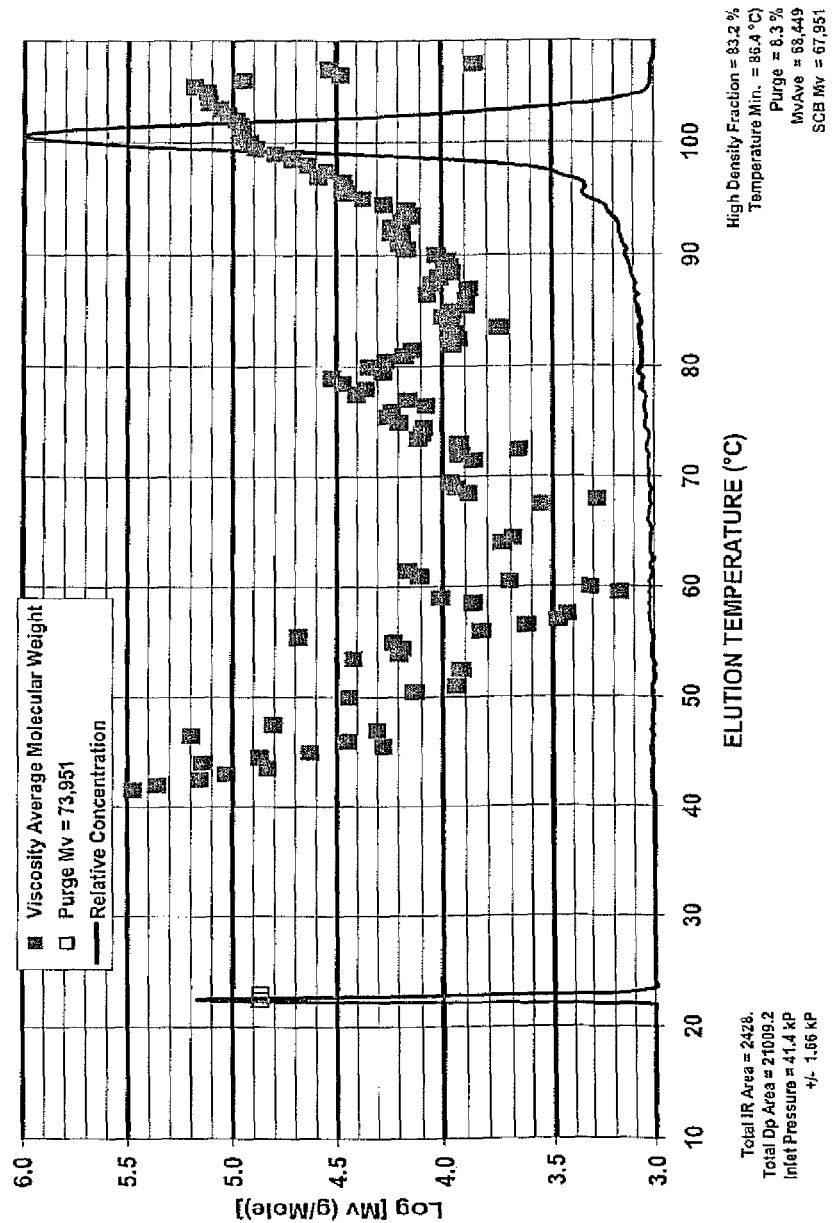
FIG. 5 is a graph illustrating how the calculated ATREF high-density fraction and purge fraction of the high molecular weight polyethylene component of the inventive Example 5 was determined.
Figure 6:
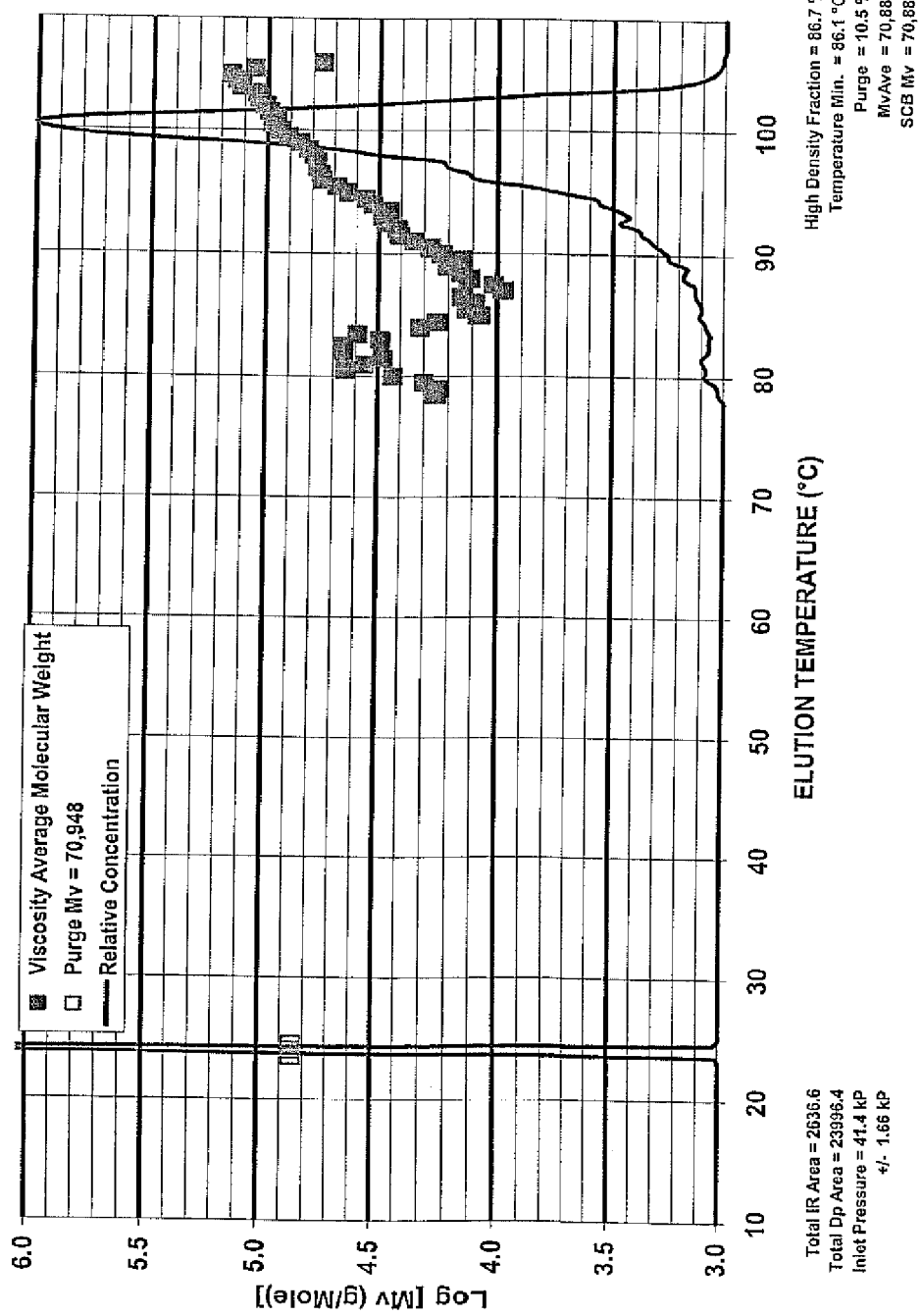
FIG. 6 is a graph illustrating how the calculated ATREF high-density fraction and purge fraction of the high molecular weight polyethylene component of the inventive Example 6 was determined.
Figure 7:
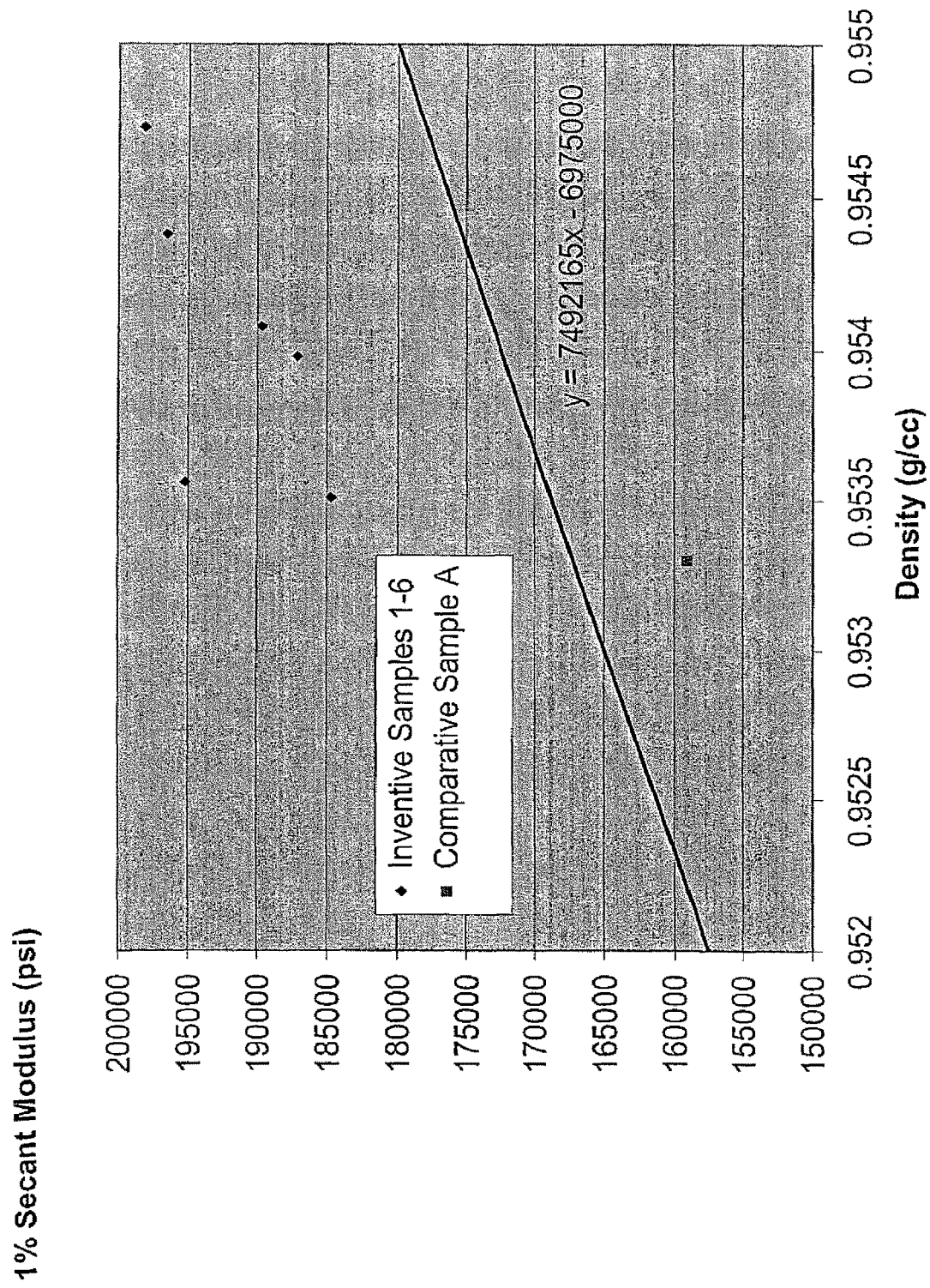
FIG. 7 is a graph illustrating the relationship between the density in g/cm$^3$ and 1% secant modulus in psi, where the inventive high-density polyethylene composition having a 1% secant modulus in psi of equal or greater to the following relationship: $[(7,492,165*density (g/cm^3))-6,975,000]$ psi (g/cm$^3$).

Inventive Examples 1-6 were prepared according to the following procedures: a dual-sequential polymerization system, e.g. a first gas phase reactor and a second gas phase reactor operating in series, was provided. Ethylene, one or more alpha-olefin comonomers, hydrogen, catalyst, e.g. Ziegler-Natta catalyst, slurried in mineral oil, N$_2$, and isopentane were fed continuously into the first reactor. Subsequently, a cocatalyst, e.g. triethylaluminum (TEAL), was fed continuously into the first reactor to activate the catalyst. The first polymerization reaction of the ethylene in the presence of 1-hexene was carried out in the first reactor under the conditions shown below in Table I thereby producing first component-catalyst complex. The first compo-nent-catalyst complex was continuously transferred to the second reactor. Additional, ethylene, hydrogen, cocatalyst, e.g. TEAL, N$_2$, and isopentane were fed continuously into the second reactor. No additional catalyst was added to the second reactor. The second polymerization reaction of ethylene was carried out in the second reactor under the conditions shown below in Table I thereby producing the first component-catalyst-second component complex. The first component-catalyst-second component complex was continuously removed from the second reactor in batches into the product chamber, where it was purged to remove residual hydrocarbons, and then transferred to a fiberpak drum. The fiberpak drum was continuously purged with humidified nitrogen. The polymer, i.e. the inventive high-density polyethylene composition, was further processed in a mixer/pelletizer. The polymer, i.e. the inventive high-density polyethylene composition, was melted in the mixer, and additives were dispersed therein the polymer, inventive high-density polyethylene composition, matrix. The inventive high-density polyethylene composition was extruded through a die plate, pelletized, and cooled. The resin samples of the Inventive Examples 1-6 were tested for their properties from pellets, or were formed into testing plaques according to ASTM D-4703-00 and then were tested for their properties. Such properties are shown in Tables I and II, and FIGS. 1-6. The resin samples of the Inventive Examples 1-6 were also tested for shrinkage properties according to ASTM D-955 utilizing a 60 mm×60 mm×2 mm plaques, and the results are shown in Table IV.

Comparative Examples A

Comparative example A is a high-density polyethylene copolymer, which is commercially available under the tradename B4020N1331 from INEOS Olefins & Polymers, USA. The resin samples of the comparative examples A were tested for their properties from pellets, or were formed into testing plaques according to ASTM D-4703-00 and then tested for their properties. Such properties are shown in Tables III.

Test Methods

Unless otherwise noted, the values reported herein were determined according to the following test methods.

Density (g/cm$^3$) was measured according to ASTM-D 792-03, Method B, in isopropanol. Specimens were measured within 1 hour of molding after conditioning in the isopropanol bath at 23° C. for 8 min to achieve thermal equilibrium prior to measurement. The specimens were compression molded according to ASTM D-4703-00 Annex A with a 5 min initial heating period at about 190° C. and a 15° C./min cooling rate per Procedure C. The specimen was cooled to 45° C. in the press with continued cooling until "cool to the touch."

Melt index (I$_2$) was measured at 190° C. under a load of 2.16 kg according to ASTM D-1238-03.

Melt index (I$_5$) was measured at 190° C. under a load of 5.0 kg according to ASTM D-1238-03.

Melt index (I$_{10}$) was measured at 190° C. under a load of 10.0 kg according to ASTM D-1238-03.

Melt index (I$_{21.6}$) was measured at 190° C. under a load of 21.6 kg according to ASTM D-1238-03.

Shrinkage was measured according to ASTM D-955 utilizing a 60 mm×60 mm×2 mm plaques.

Weight average molecular weight ($M_w$) and number average molecular weight ($M_n$) were determined according to methods known in the art using conventional GPC, as described herein below.

The molecular weight distributions of ethylene polymers were determined by gel permeation chromatography (GPC). The chromatographic system consisted of a Waters (Millford, Mass.) 150° C. high temperature gel permeation chromatograph, equipped with a Precision Detectors (Amherst, Mass.) 2-angle laser light scattering detector Model 2040. The 15° angle of the light scattering detector was used for calculation purposes. Data collection was performed using Viscotek TriSEC software version 3 and a 4-channel Viscotek Data Manager DM400. The system was equipped with an on-line solvent degas device from Polymer Laboratories. The carousel compartment was operated at 140° C. and the column compartment was operated at 150° C. The columns used were four Shodex HT 806M 300 mm, 13 µm columns and one Shodex HT803M 150 mm, 12 µm column. The solvent used was 1,2,4 trichlorobenzene. The samples were prepared at a concentration of 0.1 grams of polymer in 50 milliliters of solvent. The chromatographic solvent and the sample preparation solvent contained 200 µg/g of butylated hydroxytoluene (BHT). Both solvent sources were nitrogen sparged. Polyethylene samples were stirred gently at 160° C. for 4 hours. The injection volume used was 200 microliters, and the flow rate was 0.67 milliliters/min. Calibration of the GPC column set was performed with 21 narrow molecular weight distribution polystyrene standards, with molecular weights ranging from 580 to 8,400,000 g/mol, which were arranged in 6 "cocktail" mixtures with at least a decade of separation between individual molecular weights. The standards were purchased from Polymer Laboratories (Shropshire, UK). The polystyrene standards were prepared at 0.025 grams in 50 milliliters of solvent for molecular weights equal to, or greater than, 1,000,000 g/mol, and 0.05 grams in 50 milliliters of solvent for molecular weights less than 1,000,000 g/mol. The polystyrene standards were dissolved at 80° C. with gentle agitation for 30 minutes. The narrow standards mixtures were run first, and in order of decreasing highest molecular weight component, to minimize degradation. The polystyrene standard peak molecular weights were converted to polyethylene molecular weights using the following equation (as described in Williams and Ward, *J. Polym. Sci., Polym. Let.*, 6, 621 (1968)):

$$M \text{polyethylene} = A \times (M \text{polystyrene})^B,$$

where M is the molecular weight, A has a value of 0.41 and B is equal to 1.0. The Systematic Approach for the determination of multi-detector offsets was done in a manner consistent with that published by Balke, Mourey, et al. (Mourey and Balke, *Chromatography Polym.* Chpt 12, (1992) and Balke, Thitiratsakul, Lew, Cheung, Mourey, *Chromatography Polym.* Chpt 13, (1992)), optimizing dual detector log results from Dow broad polystyrene 1683 to the narrow standard column calibration results from the narrow standards calibration curve using in-house software. The molecular weight data for off-set determination was obtained in a manner consistent with that published by Zimm (Zimm, B. H., *J. Chem. Phys.*, 16, 1099 (1948)) and Kratochvil (Kratochvil, P., *Classical Light Scattering from Polymer Solutions*, Elsevier, Oxford, N.Y. (1987)). The overall injected concentration used for the determination of the molecular weight was obtained from the sample refractive index area and the refractive index detector calibration from a linear polyethylene homopolymer of 115,000 g/mol molecular weight, which was measured in reference to NIST polyethylene homopolymer standard 1475. The chromatographic concentrations were assumed low enough to eliminate addressing $2^{nd}$ Virial coefficient effects (concentration effects on molecular weight). Molecular weight calculations were performed using in-house software. The calculation of the number-average molecular weight, weight-average molecular weight, and z-average molecular weight were made according to the following equations, assuming that the refractometer signal is directly proportional to weight fraction. The baseline-subtracted refractometer signal can be directly substituted for weight fraction in the equations below. Note that the molecular weight can be from the conventional calibration curve or the absolute molecular weight from the light scattering to refractometer ratio. An improved estimation of z-average molecular weight, the baseline-subtracted light scattering signal can be substituted for the product of weight average molecular weight and weight fraction in equation (2) below:

$$\text{a) } \overline{Mn} = \frac{\sum_i Wf_i}{\sum_i (Wf_i / M_i)} \quad (2)$$

$$\text{b) } \overline{Mw} = \frac{\sum_i (Wf_i * M_i)}{\sum_i Wf_i}$$

$$\text{c) } \overline{Mz} = \frac{\sum_i (Wf_i * M_i^2)}{\sum_i (Wf_i * M_i)}$$

Bimodality of distributions was characterized according to the weight fraction of the highest temperature peak in temperature rising elution fractionation (typically abbreviated as "TREF") data as described, for example, in Wild et al., *Journal of Polymer Science, Poly. Phys. Ed.*, Vol. 20, p. 441 (1982), in U.S. Pat. No. 4,798,081 (Hazlitt et al.), or in U.S. Pat. No. 5,089,321 (Chum et al.), the disclosures of all of which are incorporated herein by reference. In analytical temperature rising elution fractionation analysis (as described in U.S. Pat. No. 4,798,081 and abbreviated herein as "ATREF"), the composition to be analyzed is dissolved in a suitable hot solvent (for example, 1,2,4 trichlorobenzene), and allowed to crystallized in a column containing an inert support (for example, stainless steel shot) by slowly reducing the temperature. The column was equipped with both an infra-red detector and a differential viscometer (DV) detector. An ATREF-DV chromatogram curve was then generated by eluting the crystallized polymer sample from the column by slowly increasing the temperature of the eluting solvent (1,2,4 trichlorobenzene). The ATREF-DV method is described in further detail in WO 99/14271, the disclosure of which is incorporated herein by reference.

High Density Fraction (percent) was measured via analytical temperature rising elution fractionation analysis (as described in U.S. Pat. No. 4,798,081 and abbreviated herein as "ATREF"), which is described in further details hereinafter. Analytical temperature rising elution fractionation (ATREF) analysis was conducted according to the method described in U.S. Pat. No. 4,798,081 and Wilde, L.; Ryle, T. R.; Knobeloch, D. C.; Peat, I. R.; *Determination of Branching Distributions in Polyethylene and Ethylene Copolymers*, J. Polym. Sci., 20, 441-455 (1982), which are incorporated by reference herein in their entirety. The composition to be analyzed was dissolved in trichlorobenzene and allowed to crystallize in a column containing an inert support (stainless steel shot) by slowly reducing the temperature to 20° C. at a cooling rate of 0.1° C./min. The column was equipped with an infrared detector. An ATREF chromatogram curve was then generated by eluting the crystallized polymer sample from the column by slowly increasing the temperature of the eluting solvent (trichlorobenzene) from 20 to 120° C. at a rate of 1.5° C./min.

Branching distributions were determined via crystallization analysis fractionation (CRYSTAF); described herein below. Crystallization analysis fractionation (CRYSTAF) was conducted via a CRYSTAF 200 unit commercially available from PolymerChar, Valencia, Spain. The samples were dissolved in 1,2,4 trichlorobenzene at 160° C. (0.66 mg/mL) for 1 hr and stabilized at 95° C. for 45 minutes. The sampling temperatures ranged from 95 to 30° C. at a cooling rate of 0.2° C./min. An infrared detector was used to measure the polymer solution concentrations. The cumulative soluble concentration was measured as the polymer crystallizes while the temperature was decreased. The analytical derivative of the cumulative profile reflects the short chain branching distribution of the polymer.

The CRYSTAF temperature peak and area are identified by the peak analysis module included in the CRYSTAF Software (Version 2001.b, PolymerChar, Valencia, Spain). The CRYSTAF peak finding routine identifies a temperature peak as a maximum in the dW/dT curve and the area between the largest positive inflections on either side of the identified peak in the derivative curve. To calculate the CRYSTAF curve, the preferred processing parameters are with a temperature limit of 70° C. and with smoothing parameters above the temperature limit of 0.1, and below the temperature limit of 0.3.

Solubility Distribution Breadth Index (SDBI) is the statistical value for the breadth of the CRYSTAF method which is calculated based on the following formula:

$$SDBI = \int \sqrt[4]{(T-T_w)^4 \cdot w(T)dT}$$

$$T_w = \int T \cdot w(T)dT$$

$$\int w(T)dT = 1$$

wherein T is temperature, W is weight fraction, and Tw weight average temperature.

Long Chain Branching was determined according to the methods known in the art, such as gel permeation chromatography coupled with low angle laser light scattering detector (GPC-LALLS) and gel permeation chromatography coupled with a differential viscometer detector (GPC-DV).

Resin stiffness was characterized by measuring the Flexural Modulus at 5 percent strain and Secant Modulii at 1 percent and 2 percent strain, and a test speed of 0.5 inch/min (13 mm/min) according to ASTM D 790-99 Method B.

Tensile strength at yield and elongation at break were measured according to ASTM D-638-03 employing Type IV Specimen at 2 inch/minute (50 mm/minute).

The environmental stress crack resistance (ESCR) was measured according to ASTM-D 1693-01, Condition B. The susceptibility of the resin to mechanical failure by cracking was measured under constant strain conditions, and in the presence of a crack accelerating agent such as soaps, wetting agents, etc. Measurements were carried out on notched specimens, in a 10 percent, by volume, Igepal CO-630 (vendor Rhone-Poulec, NJ) aqueous solution, maintained at 50° C., and a 100 percent, by volume, Igepal CO-630 (vendor Rhone-Poulec, NJ) aqueous solution, maintained at 50° C. The ESCR value was reported as $F_{50}$, the calculated 50 percent failure time from the probability graph, and $F_0$, where there are no failures in the trial.

Short chain branching distribution and comonomer content was measured using $C_{13}$ NMR, as discussed in Randall, *Rev. Macromol. Chem. Chys.*, C29 (2&3), pp. 285-297, and in U.S. Pat. No. 5,292,845, the disclosures of which are incorporated herein by reference to the extent related to such measurement. The samples were prepared by adding approximately 3 g of a 50/50 mixture of tetrachloroethane-d2/orthodichlorobenzene that was 0.025M in chromium acetylacetonate (relaxation agent) to 0.4 g sample in a 10 mm NMR tube. The samples were dissolved and homogenized by heating the tube and its contents to 150° C. The data was collected using a JEOL Eclipse 400 MHz NMR spectrometer, corresponding to a 13C resonance frequency of 100.6 MHz. Acquisition parameters were selected to ensure quantitative 13C data acquisition in the presence of the relaxation agent. The data was acquired using gated 1H decoupling, 4000 transients per data file, a 4.7 sec relaxation delay and 1.3 second acquisition time, a spectral width of 24,200 Hz and a file size of 64K data points, with the probe head heated to 130° C. The spectra were referenced to the methylene peak at 30 ppm. The results were calculated according to ASTM method D5017-91.

The resin rheology was measured on the ARES I (Advanced Rheometric Expansion System) Rheometer. The ARES I was a strain controlled rheometer. A rotary actuator (servomotor) applied shear deformation in the form of strain to a sample. In response, the sample generated torque, which was measured by the transducer. Strain and torque were used to calculate dynamic mechanical properties, such as modulus and viscosity. The viscoelastic properties of the sample were measured in the melt using a 25 mm in diameter parallel plate set up, at constant strain (5 percent) and temperature (190° C.) and $N_2$ purge, and as a function of varying frequency (0.01 to 500 $s^{-1}$). The storage modulus, loss modulus, tan delta, and complex viscosity of the resin were determined using Rheometrics Orchestrator software (v. 6.5.8). The viscosity ratio (0.1 rad*$s^{-1}$/100 rad*$s^{-1}$) was determined to be the ratio of the viscosity measured at a shear rate of 0.1 rad/s to the viscosity measured at a shear rate of 100 rad/s.

Vinyl unsaturations were measured according to ASTM D-6248-98.

Low shear rheological characterization is performed on a Rheometrics SR5000 in stress controlled mode, using a 25 mm parallel plates fixture. This type of geometry is preferred to cone and plate because it requires only minimal squeezing flow during sample loading, thus reducing residual stresses.

g' average was determined according to the following procedure. The chromatographic system consisted of a Waters (Millford, Mass.) 150° C. high temperature chromatograph equipped with a Precision Detectors (Amherst, Mass.) 2-angle laser light scattering detector Model 2040, an IR4 infra-red detector from Polymer Char (Valencia, Spain), and a Viscotek (Houston, Tex.) 150R 4-capillary viscometer. The 15-degree angle of the light scattering detector was used for calculation purposes. Data collection was performed using Viscotek TriSEC software version 3 and a 4-channel Viscotek Data Manager DM400. The system was equipped with an on-line solvent degas device from Polymer Laboratories. The carousel compartment was operated at 140° C.

and the column compartment was operated at 150° C. The columns used were 4 20-micron mixed-bed light scattering "Mixed A-LS" columns from Polymer Laboratories. The solvent used was 1,2,4 trichlorobenzene. The samples were prepared at a concentration of 0.1 grams of polymer in 50 milliliters of solvent. The chromatographic solvent and the sample preparation solvent contained 200 ppm of butylated hydroxytoluene (BHT). Both solvent sources were nitrogen sparged. Polyethylene samples were stirred gently at 160 degrees Celsius for 4 hours. The injection volume used was 200 microliters and the flow rate was 1 milliliters/minute.

Calibration of the GPC column set was performed with 21 narrow molecular weight distribution polystyrene standards with molecular weights ranging from 580 to 8,400,000, and were arranged in 6 "cocktail" mixtures with at least a decade of separation between individual molecular weights. The standards were purchased from Polymer Laboratories (Shropshire, UK). The polystyrene standards were prepared at 0.025 grams in 50 milliliters of solvent for molecular weights equal to or greater than 1,000,000, and 0.05 grams in 50 milliliters of solvent for molecular weights less than 1,000,000. The polystyrene standards were dissolved at 80° C. with gentle agitation for 30 minutes. The narrow standards mixtures were run first and in order of decreasing highest molecular weight component to minimize degradation. The polystyrene standard peak molecular weights were converted to polyethylene molecular weights using the following equation (as described in Williams and Ward, *J. Polym. Sci., Polym. Let.*, 6, 621 (1968)):

$$M\text{polyethylene} = A \times (M\text{polystyrene})^B$$

Where M is the molecular weight, A has a value of 0.43 and B is equal to 1.0.

The Systematic Approach for the determination of multi-detector offsets was done in a manner consistent with that published by Balke, Mourey, et. al. (Mourey and Balke, *Chromatography Polym.* Chpt 12, (1992)) (Balke, Thitiratsakul, Lew, Cheung, Mourey, *Chromatography Polym.* Chpt 13, (1992)), optimizing triple detector log (MW and IV) results from Dow Broad Polystyrene 1683 to the narrow standard column calibration results from the narrow standards calibration curve using a software. The molecular weight data for off-set determination was obtained in a manner consistent with that published by Zimm (Zimm, B. H., J. Chem. Phys., 16, 1099 (1948)) and Kratochvil (Kratochvil, P., *Classical Light Scattering from Polymer Solutions*, Elsevier, Oxford, N.Y. (1987)). The overall injected concentration used for the determination of the molecular weight was obtained from the sample refractive index area and the refractive index detector calibration from a linear polyethylene homopolymer of 115,000 molecular weight. The chromatographic concentrations were assumed low enough to eliminate addressing $2^{nd}$ Virial coefficient effects (concentration effects on molecular weight).

g' average was calculated for the samples as follow:

1. The light scattering, viscosity, and concentration detectors were calibrated with NBS 1475 homopolymer polyethylene (or equivalent reference);
2. The light scattering and viscometer detector offsets relative to the concentration detector was corrected as described in the calibration section;
3. Baselines were subtracted from the light scattering, viscometer, and concentration chromatograms and set integration windows making certain to integrate all of the low molecular weight retention volume range in the light scattering chromatogram that were observable from the refractometer chromatogram;
4. A linear homopolymer polyethylene Mark-Houwink reference line was established by injecting a standard with a polydispersity of at least 3.0, and the data file (from above calibration method), was calculated and the intrinsic viscosity and molecular weight from the mass constant corrected data for each chromatographic slice was recorded;
5. The HDPE sample of interest was injected and the data file (from above calibration method), was calculated and the intrinsic viscosity and molecular weight from the mass constant corrected data for each chromatographic slice was recorded;
6. The homopolymer linear reference intrinsic viscosity was shifted by the following factor: IV=IV+1/(1+2*SCB/1,000 C*branch point length) where IV is the intrinsic viscosity of the HDPE sample of interest, SCB/1,000 C was determined from C13 NMR, and the branch point length is 2 for butene, 4 for hexene, or 6 for octene);
7. g' average was calculated according to the following equation.

$$g' = \frac{\sum_{j=WhereM>40,000}^{HighestM} \left[ c_j \times \left( \frac{IV_j}{IV_{L_j}} \right)_M \right] + \sum_{j=LowestM}^{WhereM>40,000} c_j}{\sum_{j=LowestM}^{HighestM} c_j}$$

Where c is the concentration of the slice, IV is the intrinsic viscosity of the HDPE, and $IV_L$ is the intrinsic viscosity of the linear homopolymer polyethylene reference (corrected for SCB of the HDPE sample of interest) at the same molecular weight (M). The IV ratio was assumed to be one at molecular weights less than 40,000 to account for natural scatter in the light scattering data.

The present invention may be embodied in other forms without departing from the spirit and the essential attributes thereof, and, accordingly, reference should be made to the appended claims, rather than to the foregoing specification, as indicating the scope of the invention.

TABLE I

| | Example 1 | Example 2 | Example 3 | Example 4 | Example 5 | Example 6 |
|---|---|---|---|---|---|---|
| Co-Monomer Type | 1-hexene | 1-hexene | 1-hexene | 1-hexene | 1-hexene | 1-hexene |
| Catalyst | Ziegler-Natta | Ziegler-Natta | Ziegler-Natta | Ziegler-Natta | Ziegler-Natta | Ziegler-Natta |
| Co-Catalyst | 2.5% TEAL | 2.5% TEAL | 2.5% TEAL | 2.5% TEAL | 2.5% TEAL | 2.5% TEAL |
| $1^{st}$ Reactor Type | Gas Phase | Gas Phase | Gas Phase | Gas Phase | Gas Phase | Gas Phase |
| $2^{nd}$ Reactor Type | Gas Phase | Gas Phase | Gas Phase | Gas Phase | Gas Phase | Gas Phase |
| $1^{st}$ Reaction Temperature (° C.) | 85 | 85 | 85 | 85 | 85 | 85 |
| $2^{nd}$ Reaction Temperature (° C.) | 95 | 110 | 95 | 95 | 95 | 95 |
| $1^{st}$ Reaction Pressure (psi) | 348 | 350 | 349 | 348 | 350 | 350 |
| $2^{nd}$ Reaction Pressure (psi) | 384 | 399 | 398 | 394 | 397 | 398 |
| $1^{st}$ Reactor $C_2$ Partial Pressure (psi) | 22.9 | 32.3 | 33.9 | 29.1 | 45.2 | 48.1 |

TABLE I-continued

|  | Example 1 | Example 2 | Example 3 | Example 4 | Example 5 | Example 6 |
|---|---|---|---|---|---|---|
| $2^{nd}$ Reactor $C_2$ Partial Pressure (psi) | 112.1 | 92.1 | 88.8 | 103.0 | 87.4 | 86.2 |
| $1^{st}$ Reactor $H_2/C_2$ Molar Ratio | 0.090 | 0.145 | 0.146 | 0.145 | 0.207 | 0.203 |
| $2^{nd}$ Reactor $H_2/C_2$ Molar Ratio | 1.40 | 1.80 | 1.40 | 0.80 | 0.80 | 1.40 |
| $1^{st}$ Reactor $C_6/C_2$ Molar Ratio | 0.060 | 0.036 | 0.031 | 0.032 | 0.020 | 0.021 |
| $2^{nd}$ Reactor $C_6/C_2$ Molar Ratio | 0.002 | 0.002 | 0.002 | 0.002 | 0.003 | 0.003 |
| $1^{st}$ Reactor Isopentane (Mole %) | 10.586 | 9.714 | 4.893 | 10.185 | 9.728 | 9.454 |
| $2^{nd}$ Reactor Isopentane (Mole %) | 1.117 | 0.971 | 0.976 | 1.046 | 1.055 | 1.005 |

TABLE II

|  | Example 1 | Example 2 | Example 3 | Example 4 | Example 5 | Example 6 |
|---|---|---|---|---|---|---|
| Split ($1^{st}$ reactor/$2^{nd}$ reactor) | 0.425/0.575 | 0.551/0.449 | 0.520/0.480 | 0.450/0.550 | 0.581/0.419 | 0.640/0.360 |
| Cocatalyst Feed Rate (cc/hr) ($1^{st}$ reactor/$2^{nd}$ reactor) | 150/167 | 146/170 | 144/169 | 146/169 | 143/172 | 147/169 |
| Production Rate (lb/hr) ($1^{st}$ reactor/$2^{nd}$ reactor) | 23.0/30.8 | 29.9/24.4 | 30.1/27.6 | 25.1/30.4 | 30.0/21.6 | 29.9/16.7 |
| Bed Weight (lbs) ($1^{st}$ reactor/$2^{nd}$ reactor) | 80.7/120.8 | 79.6/125.2 | 85/122.2 | 81.7/111.8 | 79.1/114.2 | 79.9/122.2 |
| FBD (lb/$ft^3$) ($1^{st}$ reactor/$2^{nd}$ reactor) | 12.0/15.4 | 12.0/15.9 | 12.4/14.7 | 12.2/13.9 | 12.0/14.0 | 12.2/14.9 |
| Bed Volume ($ft^3$) ($1^{st}$ reactor/$2^{nd}$ reactor) | 6.7/7.9 | 6.7/7.9 | 6.8/8.3 | 6.7/8.0 | 6.6/8.2 | 6.6/8.2 |
| Residence Time (hr) ($1^{st}$ reactor/$2^{nd}$ reactor) | 3.5/2.2 | 2.7/2.3 | 2.8/2.1 | 3.3/2.2 | 2.6/2.2 | 2.7/2.6 |
| STY (lb/hr/$ft^3$) ($1^{st}$ reactor/$2^{nd}$ reactor) | 3.4/3.9 | 4.5/3.1 | 4.4/3.3 | 3.8/3.8 | 4.6/2.6 | 4.5/2.0 |
| Melt index ($I_{21}$) ($1^{ST}$ Component) (~) (g/10 minutes) | 2.46 | 4.84 | 4.79 | 4.63 | 10.79 | 11.04 |
| Density (First Component) (~) (g/$cm^3$) | 0.9288 | 0.9358 | 0.9369 | 0.9366 | 0.9433 | 0.9430 |
| Residual Ti (ppm) ($1^{st}$ component/$2^{nd}$ component) | 3.93/1.75 | 3.57/2.15 | 3.87/1.96 | 3.6/1.78 | 2.57/1.65 | 2.35/1.54 |
| Residual Al (ppm) ($1^{st}$ component/$2^{nd}$ component) | 108/66.8 | 86.4/61.5 | 88.4/60.2 | 100.2/72.7 | 82.0/68.4 | 77.7/67.7 |
| Al/Ti Molar Residual Ti (ppm) ($1^{st}$ component/$2^{nd}$ component) | 49.2/68.6 | 43.3/52.3 | 41.0/55.0 | 49.7/71.0 | 56.6/73.7 | 59.1/78.4 |
| Bulk Density (lb/$ft^3$) Residual Ti (ppm) ($1^{st}$ component/$2^{nd}$ component) | 18.3/24.0 | 18.6/24.8 | 18.3/22.9 | 19.0/23.0 | 19.5/22.7 | 19.2/22.7 |
| H-D Polyethylene Composition Melt Index ($I_2$) (2.16 g/10 minutes) | 1.6 | 1.5 | 1.4 | 1.5 | 1.6 | 1.6 |
| H-D Polyethylene Composition Melt Index ($I_5$) (5.0 g/10 minutes) | 5.9 | 5.3 | 4.8 | 4.8 | 5.0 | 5.1 |
| H-D Polyethylene Composition Melt Index ($I_{21.6}$) (21.6 g/10 minutes) | 89.1 | 86.4 | 63.0 | 53.2 | 50.9 | 57.7 |
| H-D Polyethylene Composition Melt Flow Ratio ($MI_{21}/MI_2$) | 57 | 58 | 44 | 36 | 32 | 36 |
| H-D Polyethylene Composition Melt Flow Ratio ($MI_{21}/MI_5$) | 15 | 16 | 13 | 11 | 10 | 11 |
| H-D Polyethylene Composition ($M_n$) | 12730 | 10030 | 11700 | 14670 | 19600 | 13400 |
| H-D Polyethylene Composition ($M_w$) | 115750 | 105460 | 106790 | 106710 | 106580 | 104680 |
| H-D Polyethylene Composition ($M_w/M_n$) | 9.1 | 10.5 | 9.1 | 7.3 | 5.4 | 7.8 |
| H-D Polyethylene Composition (Mz) | 791400 | 579000 | 482600 | 473000 | 423800 | 463300 |
| Atref HD Fraction (%) | 83.0 | 83.2 | 79.3 | 82.0 | 83.2 | 86.7 |
| Atref Purge fraction (%) | 10.5 | 13.3 | 10.6 | 14.2 | 8.3 | 10.5 |
| Atref MV average | 70412 | 77439 | 65518 | 75618 | 68449 | 70887 |
| Atref Purge Mv | 78227 | 81700 | 72441 | 82924 | 73951 | 70948 |
| Viscosity at $10 - 2$ $sec^{-1}$ Shear Rate (Pa·s) | 10265 | 9110 | 8764 | 8294 | 6973 | 7460 |
| Viscosity at $10 + 2$ $sec^{-1}$ Shear Rate (Pa·s) | 910 | 932 | 1059 | 1123 | 1184 | 1102 |
| Ratio $10 - 2/10 + 2$ | 11.3 | 9.8 | 8.3 | 7.4 | 5.9 | 6.8 |
| Flexural Modulus (0.5 in/min) (psi) | 227051 | 240071 | 235814 | 239265 | 233248 | 240173 |
| 2% Secant Modulus (psi) | 151884 | 162889 | 155572 | 160280 | 153836 | 161766 |
| 1% Secant Modulus (psi) | 184733 | 198177 | 189700 | 195254 | 187175 | 196579 |
| Tensile Strength (psi) | 1716 | 1423 | 2786 | 3340 | 3707 | 4095 |
| Elongation at Break (%) | 931.1 | 698.9 | 583.5 | 754.1 | 917.9 | 1139.5 |
| Yield Strength (psi) | 3500 | 3500 | 3519 | 3305 | 3694 | 3943 |
| Elongation at Yield (%) | 4.66 | 5.84 | 5.10 | 90.49 | 7.58 | 9.06 |
| ESCR Test Data |  |  |  |  |  |  |
| 50° C.; 10% Igepal; 75 mil plaque, 12 mil slit (F50 hours) | 282.5 | 101.2 | 64.2 | 44.2 | 24.8 | 45 |
| 50° C.; 100% Igepal; 75 mil plaque, 12 mil slit (F50 hours) | F0 > 2000 | >1470 | >740 | 242.4 | 146.9 | 151.2 |

TABLE III

|  | Comparative A |
|---|---|
| Melt Index ($I_2$) (2.16 g/10 minutes) | 2.2 |
| Melt Index ($I_5$) (5.0 g/10 minutes) | 7.0 |
| Melt Index ($I_{21.6}$) (21.6 g/10 minutes) | 90.2 |
| Melt Flow Ratio ($MI_{21}/MI_2$) | 42 |
| Melt Flow Ratio ($MI_{21}/MI_5$) | 12.9 |

TABLE III-continued

| | |
|---|---|
| Density (g/cm³) | 0.9533 |
| $M_n$ | 17910 |
| $M_w$ | 111930 |
| $M_w/M_n$ | 6.25 |
| Atref HD Fraction (%) | 74.4 |
| Atref Purge fraction (%) | 15.8 |
| Atref MV average | 68498 |
| Atref Purge Mv | 76271 |
| Viscosity at 10 − 2 sec-1 Shear Rate (Pa · s) | 5100 |
| Viscosity at 10 + 2 sec-1 Shear Rate (Pa· s) | 960 |
| Ratio 10 − 2/10 + 2 | 5.3 |
| Flexural Modulus (0.5 in/min) (psi) | 203238 |
| 2% Secant Modulus (psi) | 131837 |
| 1% Secant Modulus (psi) | 159092 |
| Tensile Strength (psi) | 2765 |
| Elongation at Break (%) | 990.6 |
| Yield Strength (psi) | 3870 |
| Elongation at Yield (%) | — |
| ESCR Test Data | |
| 50 C 10% Igepal 75 mil plaque, 12 mil slit ( F50 hours) | 35.2 |
| 50 C 100% Igepal 75 mil plaque, 12 mil slit ( F50 hours) | 26.1 |

| Example No. | Color | Nucleator | Shrinkage in flow direction after 48 hours (%) | Shrinkage in cross-flow direction after 48 hours (%) |
|---|---|---|---|---|
| Inventive 1 | Natural | None | 3.51 | 1.01 |
| Inventive 1 | Green | None | 3.65 | 0.96 |
| Inventive 1 | Blue | None | 3.68 | 1.05 |
| Inventive 2 | Natural | None | 3.77 | 0.99 |
| Inventive 2 | Green | None | 3.78 | 1.25 |
| Inventive 2 | Blue | None | 3.93 | 0.93 |
| Inventive 3 | Natural | None | 3.48 | 1.02 |
| Inventive 3 | Green | None | 3.59 | 0.83 |
| Inventive 3 | Blue | None | 3.65 | 1.05 |
| Inventive 4 | Natural | None | 3.47 | 1.25 |
| Inventive 4 | Green | None | 3.53 | 0.78 |
| Inventive 4 | Blue | None | 3.77 | 1.35 |
| Inventive 5 | Natural | None | 3.44 | 1.20 |
| Inventive 5 | Natural | HPN-20E | 3.52 | 0.53 |
| Inventive 5 | Natural | KSt | 3.59 | 0.91 |
| Inventive 5 | White | None | 3.77 | 1.17 |
| Inventive 5 | Green | None | 3.53 | 1.10 |
| Inventive 5 | Red | None | 3.62 | 0.76 |
| Inventive 5 | White-2 | None | 3.69 | 1.18 |
| Inventive 5 | Blue | None | 3.45 | 1.11 |
| Inventive 5 | Orange | None | 3.70 | 0.65 |
| Inventive 5 | White | HPN-20E | 3.52 | 0.53 |
| Inventive 5 | Green | HPN-20E | 3.53 | 0.73 |
| Inventive 5 | Red | HPN-20E | 3.59 | 0.59 |
| Inventive 5 | White-2 | HPN-20E | 3.63 | 0.39 |
| Inventive 5 | Blue | HPN-20E | 3.50 | 0.56 |
| Inventive 5 | Orange | HPN-20E | 3.63 | 0.48 |
| Inventive 5 | Green | KSt | 3.53 | 0.97 |
| Inventive 5 | Blue | KSt | 3.56 | 0.91 |
| Inventive 6 | Natural | None | 3.48 | 1.10 |
| Inventive 6 | Green | None | 3.54 | 1.08 |
| Inventive 6 | Blue | None | 3.65 | 1.09 |
| Comparative A | Natural | None | 3.57 | 1.39 |
| Comparative A | White | None | 3.38 | 1.22 |
| Comparative A | Blue | None | 3.39 | 1.24 |
| Comparative A | Orange | None | 3.93 | 0.91 |

We claim:

1. A manufactured article comprising an injection-molded bottle cap closure comprising a skirt that axially extends from the periphery of a base, and internal screw threads for securing the cap to a container, the bottle cap closure comprising:

a high-density polyethylene composition comprising:

a first component, said first component being a high molecular weight ethylene alpha-olefin copolymer having a density in the range of 0.920 to 0.946 g/cm³, and a melt index ($I_{21.6}$) in the range of 1 to 15 g/10 minutes; and a second component, said second component being a low molecular weight ethylene polymer having a density in the range of 0.965 to 0.980 g/cm³, and a melt index ($I_2$) in the range of 30 to 1500 g/10 minutes;

wherein said high-density polyethylene composition having a melt index ($I_2$) of at least 1 g/10 minutes, a density in the range of 0.950 to 0.960 g/cm³; and wherein said high-density polyethylene composition has a 1% secant modulus in psi of equal or greater to the following relationship: [7,492,165*density (g/cm³))−6,975,000] psi/(g/cm³));

wherein said high-density polyethylene composition has a molecular weight distribution (Mw/Mn) from 5 to 13, wherein said high-density polyethylene composition has a standard deviation of flow direction shrinkage of less than 7 percent across different colors.

2. The manufactured article according to claim 1, wherein said high-density polyethylene composition has an environmental stress crack resistance of at least 10 hours measured via ASTM D-1693 condition B, 10% Igepal, or at least 100 hours measured via ASTM D-1693 condition B, 100% Igepal.

* * * * *